(12) United States Patent
Inoue et al.

(10) Patent No.: US 8,165,778 B2
(45) Date of Patent: Apr. 24, 2012

(54) VARIABLE VALVE TIMING APPARATUS AND CONTROL METHOD THEREOF

(75) Inventors: Yasumichi Inoue, Toyota (JP);
Zenichiro Mashiki, Nisshin (JP);
Haruyuki Urushihata, Chiryu (JP)

(73) Assignees: Toyota Jidosha Kabushiki Kaisha, Aichi-ken (JP); Denso Corporation, Aichi-ken (JP)

( * ) Notice: Subject to any disclaimer, the term of this patent is extended or adjusted under 35 U.S.C. 154(b) by 876 days.

(21) Appl. No.: 12/279,299

(22) PCT Filed: Feb. 26, 2007

(86) PCT No.: PCT/JP2007/054118
§ 371 (c)(1),
(2), (4) Date: Aug. 13, 2008

(87) PCT Pub. No.: WO2007/122876
PCT Pub. Date: Nov. 1, 2007

(65) Prior Publication Data
US 2009/0025665 A1     Jan. 29, 2009

(30) Foreign Application Priority Data
Mar. 31, 2006   (JP) ................................ 2006-099121

(51) Int. Cl.
F02D 13/02    (2006.01)
F01L 1/34     (2006.01)
G06F 19/00    (2011.01)
G08B 21/18    (2006.01)

(52) U.S. Cl. ...................... 701/103; 123/90.17; 701/114; 340/438

(58) Field of Classification Search .......... 701/101–106, 701/110, 114, 115; 123/90.11, 90.15–90.17, 123/90.23, 321–323, 345–348; 340/438, 340/439
See application file for complete search history.

(56) References Cited

U.S. PATENT DOCUMENTS

| | | | |
|---|---|---|---|
| 6,705,256 B2 * | 3/2004 | Yamaki et al. | 123/90.11 |
| 7,287,500 B2 * | 10/2007 | Izumi et al. | 123/179.18 |
| 2001/0004883 A1 * | 6/2001 | Tachibana et al. | 123/90.15 |
| 2002/0100442 A1 * | 8/2002 | Takahashi et al. | 123/90.17 |
| 2004/0237916 A1 | 12/2004 | Takahashi | |
| 2006/0260573 A1 * | 11/2006 | Urushihata et al. | 123/90.15 |
| 2009/0125215 A1 * | 5/2009 | Blom | 701/105 |

FOREIGN PATENT DOCUMENTS

JP     08-200020 A    8/1996
(Continued)

*Primary Examiner* — Willis Wolfe, Jr.
*Assistant Examiner* — Johnny Hoang
(74) *Attorney, Agent, or Firm* — Sughrue Mion, PLLC

(57) ABSTRACT

At the time of reference position learning for ensuring accuracy in detecting a valve timing, an operation amount of an actuator is set such that intake valve phase changes to a position of most retarded angle as a reference phase. When the intake valve phase reaches the most retarded angle and the change in the intake valve phase stops (YES at S150), it is determined that the intake valve phase has reached the reference phase and the learning is terminated normally. If the learning operation does not end normally even after the time lapse from the start of learning exceeds a limit time Tlmt, the reference position learning is terminated forcibly (YES at S170), and power supply to the actuator is stopped. Thus, power consumption can be reduced and the apparatus can be protected at the time of reference position learning.

14 Claims, 14 Drawing Sheets

FOREIGN PATENT DOCUMENTS

| | | |
|---|---|---|
| JP | 2001-082195 A | 3/2001 |
| JP | 2001-159330 A | 6/2001 |
| JP | 2001-234764 A | 8/2001 |
| JP | 2001-234765 A | 8/2001 |
| JP | 2004-156461 A | 6/2004 |
| JP | 2004-340013 A | 12/2004 |

* cited by examiner

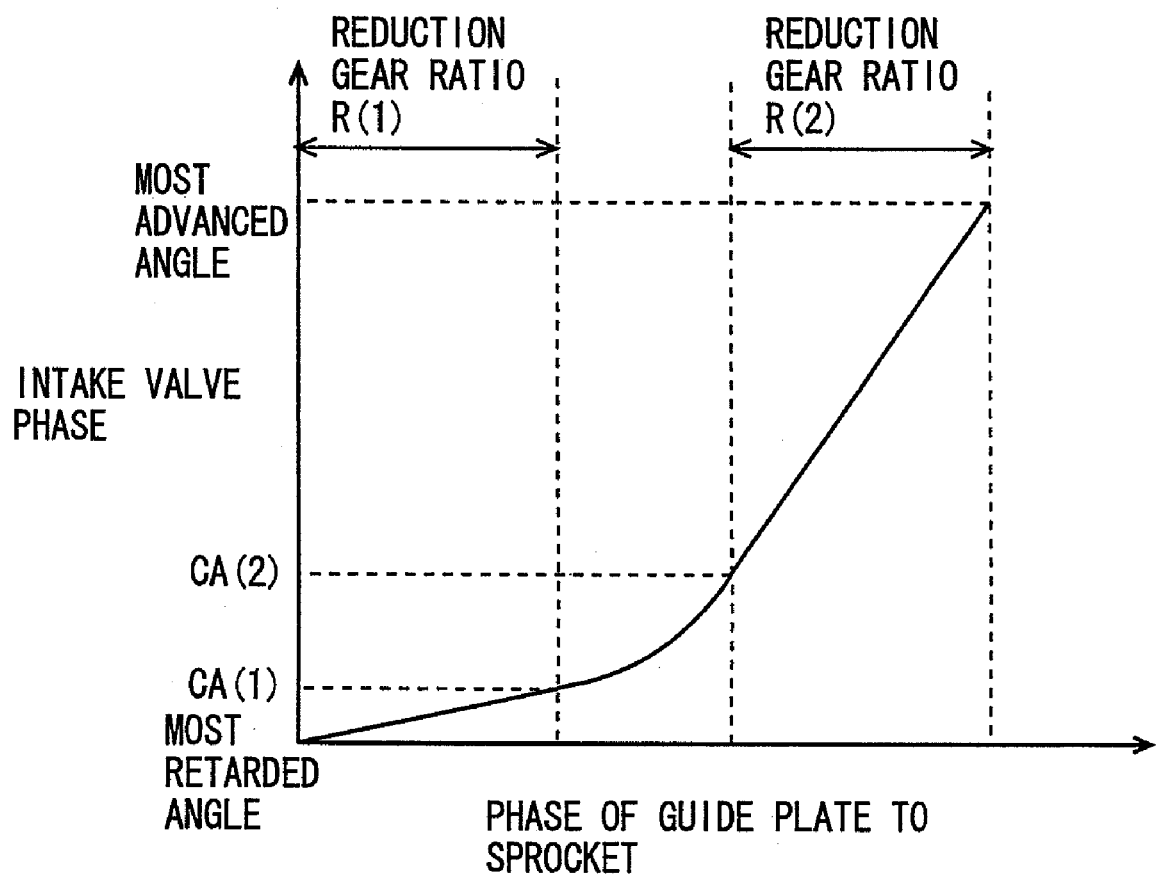
F I G. 10

VARIABLE VALVE TIMING APPARATUS AND CONTROL METHOD THEREOF

TECHNICAL FIELD

The present invention relates to a variable valve timing apparatus. In particular, the invention relates to a variable valve timing apparatus having a mechanism that changes the timing at which a valve is opened/closed by an amount of change according to an operation amount of an actuator.

BACKGROUND ART

A VVT (Variable Valve Timing) apparatus has conventionally been known that changes the timing at which an intake valve or an exhaust valve is opened/closed, that is, the opening/closing phase (crank angle) according to an operating condition. Generally, in the variable valve timing apparatus, the phase is changed by rotating a camshaft, which opens/closes the intake valve or exhaust valve, relative to a sprocket or the like. The camshaft is rotated by an actuator such as a hydraulic or electric motor.

In order to accurately control the valve opening/closing phase (valve timing) using such a variable valve timing apparatus, it is necessary to prevent error in detecting the actual phase of valve opening/closing. In order to reduce the detection error, it has been a common practice to set the valve opening/closing phase at a prescribed reference position that is limited mechanically, and to learn the error in the detected value of valve opening/closing phase at that time as an offset.

In an intake valve driving apparatus disclosed in Patent Document 1 (Japanese Patent Laying-Open No. 2004-340013), target working angle and target phase are set by adding a learning correction value or values, whereby variation in variable valve control is corrected. Particularly, according to Patent Document 1, the effect of suppressing variation is improved when the learning operation for updating the learning correction value is done on a low-speed, low-load side.

In a variable valve timing apparatus disclosed in Patent Document 2 (Japanese Patent Laying-Open No. 2004-156461), reference position of the valve timing is learned under prescribed learning conditions (for example, every time engine operation starts), to ensure detection accuracy of the actual valve timing. Further, according to the disclosure, when learning is not complete, it is determined that the detection accuracy is low, and the rate of change in valve timing is limited. Consequently, damage to the apparatus caused by a movable portion hitting a stopper or the like at high speed can be prevented.

As one type of variable valve timing apparatus, a mechanism has been used in which, when an actuator operating a movable portion for changing the valve timing is stopped, the movable portion is urged by a spring or the like, or operation of the movable portion is limited by a lock-pin or the like, so that the valve timing is automatically returned to the reference position. In such a mechanism, the reference position learning is naturally done at the time of such return.

In a variable valve timing apparatus having such a mechanism that the valve timing is changed by an amount in accordance with the operation amount of the actuator and the valve timing is fixed when the actuator is stopped, it is necessary to execute the reference position learning for ensuring accuracy in detecting actual valve timing, in consideration of protection of apparatuses as well as operation energy (power consumption) of the actuator. Patent Documents 1 and 2 mentioned above do not describe any specific contents of reference position learning from such a viewpoint.

DISCLOSURE OF THE INVENTION

An object of the present invention is to provide a variable valve timing apparatus that realizes protection of apparatuses and reduction in power consumption during reference position learning for ensuring accuracy in detecting the valve timing.

The present invention provides a variable valve timing apparatus for changing a timing of opening/closing at least one of an intake valve and an exhaust valve provided in an engine, including an actuator operating the variable valve timing apparatus, a changing mechanism changing the opening/closing timing by an amount of change in accordance with an operation amount of the actuator, a reference position learning portion, a detecting portion and a termination forcing portion. The reference position learning portion is configured to execute a learning operation by generating an actuator operation command so that the opening/closing timing is changed to a prescribed timing, and when the opening/closing timing reaches the prescribed timing, to learn the reference timing of opening/closing and to terminate the learning operation, in response. The detecting portion detects a lapse of a prescribed limit time from the start of the learning operation. The termination forcing portion forces termination of the learning operation even when the opening/closing timing has not yet reached the prescribed timing, if the lapse of the limit time is detected by the detecting portion.

Alternatively, the present invention provides a variable valve timing apparatus for changing a timing of opening/closing at least one of an intake valve and an exhaust valve provided in an engine, including an actuator operating the variable valve timing apparatus, a changing mechanism changing the opening/closing timing by an amount of change in accordance with an operation amount of the actuator, and a control unit controlling the operation of the actuator. The control unit is configured to execute a learning operation by generating an actuator operation command so that the opening/closing timing is changed to a prescribed timing, and when the opening/closing timing reaches the prescribed timing, to learn the reference timing of opening/closing and to terminate the learning operation in response. The control unit is further configured to force termination of the learning operation even when the opening/closing timing has not yet reached the prescribed timing, if a lapse of a prescribed limit time from the start of the learning operation is detected.

The present invention provides a method of controlling a variable valve timing apparatus for changing a timing of opening/closing at least one of an intake valve and an exhaust valve provided in an engine, including a reference position learning step, a detecting step, and a termination forcing step. The variable valve timing apparatus includes an actuator operating the variable valve timing apparatus, and a changing mechanism that changes the opening/closing timing by an amount of change in accordance with an operation amount of the actuator. In the reference position learning step, a learning operation is executed by generating an actuator operation command so that the opening/closing timing is changed to a prescribed timing, and when the opening/closing timing reaches the prescribed timing, the reference timing of opening/closing is learned and the learning operation is terminated in response. In the detecting step, a lapse of a prescribed limit time from the start of learning operation is detected. In the termination forcing step, the learning operation is terminated forcibly even when the opening/closing timing has not yet reached the prescribed timing, if the lapse of the prescribed limit time is detected in the detecting step.

According to the variable valve timing apparatus or the control method thereof, in the reference position learning in which the opening/closing timing (valve timing) is changed to a prescribed timing using an actuator, even when the opening/closing timing has not yet fully reached the prescribed timing and the learning operation cannot be terminated normally, it is possible to terminate the learning operation forcibly if a preset limit time has elapsed and to stop the actuator. Therefore, excessively long learning of the reference position, which may lead to increased power consumption and heat build-up of the actuator, can be prevented. As a result, it becomes possible to reduce power consumption and to protect the apparatus when the reference position learning is executed.

Preferably, in the variable valve timing apparatus in accordance with the present invention, the termination forcing portion executes at least one of raising an alarm to a passenger over the forced termination of the learning operation and storing the forced termination as a piece of information for identifying the contents of failure. Alternatively, when the learning operation is terminated forcibly, the control unit executes at least one of raising an alarm to the passenger and storage of the forced termination as a piece of information for identifying the contents of the failure.

Preferably, in the method of controlling the variable valve timing apparatus in accordance with the present invention, in the step of forcing termination, when the learning operation is terminated forcibly, at least one of raising an alarm to the passenger and storage of the forced termination as a piece of information for identifying the contents of the failure is executed.

According to the variable valve timing apparatus or the control method thereof described above, when the reference position learning did not end normally, there is a concern about mechanical failure of the changing mechanism or degraded mileage caused by lower accuracy in valve timing control. Therefore, an alarm recommending inspection or the like (such as a diagnosis monitor) may be raised to the passenger. Further, a piece of information (diagnosis code) representing abnormal termination of the reference position learning can be stored, and hence, appropriate maintenance can be realized.

Preferably, the variable valve timing in accordance with the present invention further includes a power supply stopping portion. The changing mechanism is configured to change the opening/closing timing by a first amount of change in accordance with the operation amount of the actuator when the opening/closing timing is in a first region, and to change the opening/closing timing by a second amount of change larger than the first amount of change in accordance with the operation amount of the actuator when the opening/closing timing is in a second region different from the first region, and the prescribed timing is provided in the first region. The power supply stopping portion stops power supply to the actuator when the learning operation is terminated forcibly by the termination forcing portion. Alternatively, the control unit further stops power supply to the actuator when the learning operation is terminated forcibly.

Preferably, the method of controlling variable valve timing apparatus in accordance with the present invention further includes a power supply stopping step. The changing mechanism is configured to change the opening/closing timing by a first amount of change in accordance with the operation amount of the actuator when the opening/closing timing is in a first region, and to change the opening/closing timing by a second amount of change larger than the first amount of change in accordance with the operation amount of the actuator when the opening/closing timing is in a second region different from the first region, and the prescribed timing is provided in the first region. In the power supply stopping step, power supply to the actuator is stopped when the learning operation is terminated forcibly in the termination forcing step.

According to the variable valve timing apparatus or the control method thereof, the opening/closing timing (valve timing) at the completion of reference position learning is in a region (first region) where the amount of change in opening/closing timing is small relative to the actuator operation amount. Therefore, the opening/closing timing at this time can be maintained even if the power supply to the actuator is stopped as the reference position learning is terminated forcibly. Therefore, when the reference position learning is terminated forcibly because of the lapse of the limit time, power supply to the actuator is also stopped, whereby wasteful power consumption and heat build-up thereafter can more reliably be prevented.

More preferably, in the variable valve timing apparatus in accordance with the present invention, the changing mechanism is configured such that the change in opening/closing timing is mechanically limited at the prescribed timing. The detecting portion detects that the opening/closing timing has reached the prescribed timing when the amount of change in the opening/closing timing attains to approximately zero while the operation command for changing the opening/closing timing to the prescribed timing is generated. Alternatively, the control unit detects that the opening/closing timing has reached the prescribed timing when the amount of change in the opening/closing timing attains to approximately zero while the operation command for changing the opening/closing timing to the prescribed timing is generated.

Preferably, in the method of controlling the variable valve timing apparatus in accordance with the present invention, the changing mechanism is configured such that the change in the opening/closing timing is mechanically limited at the prescribed timing. In the detecting step, it is detected that the opening/closing timing has reached the prescribed timing when the amount of change in the opening/closing timing attains to approximately zero while the operation command for changing the opening/closing timing to the prescribed timing is generated.

According to the variable valve timing apparatus or the control method thereof, the change in opening/closing timing (valve timing) at the time of reference position learning is mechanically limited. Therefore, by monitoring whether the amount of change in valve timing is approximately zero or not at the time of reference position learning, it is possible to quickly detect the completion of learning. Further, in such a mechanism, heat generation and energy consumption by the actuator increase when the change in valve timing is mechanically limited and, therefore, the effect of reducing power consumption and protecting the apparatus attained by stopping power supply to the actuator is particularly significant.

Further, in the variable valve timing apparatus or the control method thereof in accordance with the present invention, the prescribed timing is set corresponding to the limit position of variable range of the opening/closing timing changed by the changing mechanism.

According to the variable valve timing apparatus or the control method thereof, the reference position learning can be executed without adding any special mechanism, by utilizing the limit position (such as the phase of most retarded angle) of the variable range of opening/closing timing (valve timing).

Alternatively, in the variable valve timing apparatus or the control method thereof, the actuator is implemented by an electric motor, and the operation amount of the actuator is difference in rotation speed of the electric motor relative to the rotation speed of a camshaft driving the valve of which opening/closing timing is to be changed.

According to the variable valve timing apparatus or the control method thereof, in a configuration in which an electric motor is the actuator and the operation amount of the actuator is difference in rotation speed of the electric motor relative to the rotation speed of a camshaft of which rotation is stopped as the engine stops, excessively long learning of the reference position, which may lead to increased power consumption and heat build-up of the actuator, can be prevented.

Therefore, a main advantage of the present invention is that during reference position learning to ensure accuracy in detecting valve opening/closing timing (valve timing), power consumption can be reduced and the apparatus can be protected.

BRIEF DESCRIPTION OF THE DRAWINGS

FIG. 10 shows a relation between the phase of a guide plate relative to a sprocket and the phase of an intake camshaft.

BEST MODES FOR CARRYING OUT THE INVENTION

Figure 1:
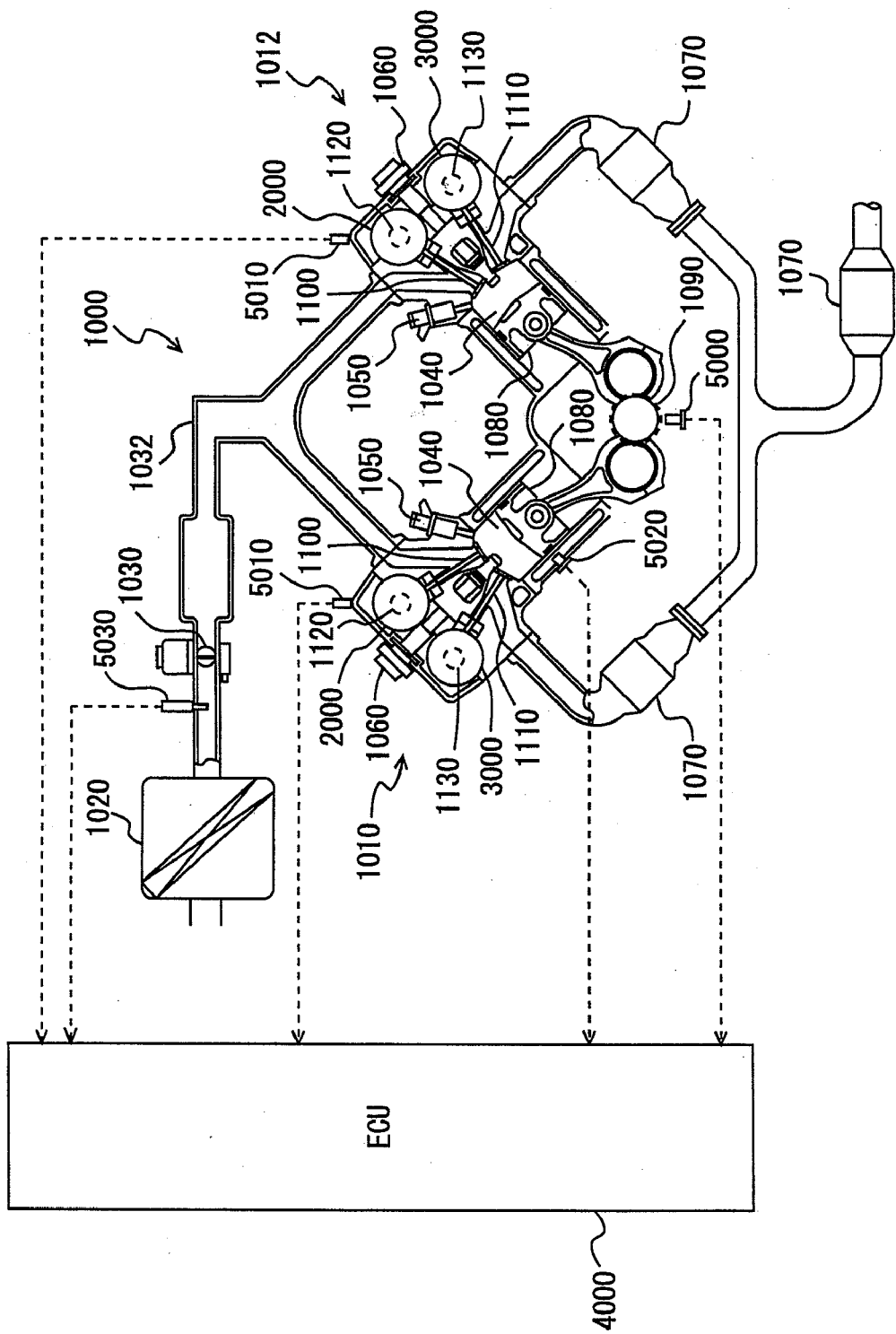
FIG. 1 is a schematic diagram showing a configuration of an engine of a vehicle on which the variable valve timing apparatus in accordance with an embodiment of the present invention is mounted.

With reference to the drawings, embodiments of the present invention will be hereinafter described. In the following description, like components are denoted by like reference characters. Their names and functions are also the same. Therefore, detailed description thereof will not be repeated.

Referring to FIG. 1, a description is given of an engine of a vehicle on which a variable valve timing apparatus is mounted, according to an embodiment of the present invention.

An engine 1000 is a V-type 8-cylinder engine having a first bank 1010 and a second bank 1012 each including a group of four cylinders. Here, application of the present invention is not limited to any engine type, and the variable valve timing apparatus that will be described in the following is applicable to an engine of the type different from the V-type 8 cylinder engine.

Into engine 1000, air is sucked from an air cleaner 1020. The quantity of sucked air is adjusted by a throttle valve 1030. Throttle valve 1030 is an electronic throttle valve driven by a motor.

The air is supplied through an intake manifold 1032 into a cylinder 1040. The air is mixed with fuel in cylinder 1040 (combustion chamber). Into cylinder 1040, the fuel is directly injected from an injector 1050. In other words, injection holes of injector 1050 are provided within cylinder 1040.

The fuel is injected in the intake stroke. The fuel injection timing is not limited to the intake stroke. Further, in the present embodiment, engine 1000 is described as a direct-injection engine having injection holes of injector 1050 that are disposed within cylinder 1040. However, in addition to direct-injection (in-cylinder) injector 1050, a port injector may be provided. Moreover, only the port injector may be provided.

The air-fuel mixture in cylinder 1040 is ignited by a spark plug 1060 and accordingly burned. The air-fuel mixture after burned, namely exhaust gas, is cleaned by a three-way catalyst 1070 and thereafter discharged to the outside of the vehicle. The air-fuel mixture is burned to press down a piston 1080 and thereby to rotate a crankshaft 1090.

At the top of cylinder 1040, an intake valve 1100 and an exhaust valve 1110 are provided. Intake valve 1100 is driven by an intake camshaft 1120. Exhaust valve 1110 is driven by an exhaust camshaft 1130. Intake camshaft 1120 and exhaust camshaft 1130 are coupled by such parts as a chain and gears to be rotated at the same rotation speed (one-half the rotation speed of crankshaft 1090). The rotation speed of a rotating body such as a shaft is generally represented by the number of rotations per unit time (typically, number of rotations per minute: rpm).

Intake valve 1100 has its phase (opening/closing timing) controlled by an intake VVT mechanism 2000 provided to intake camshaft 1120. Exhaust valve 1110 has its phase (opening/closing timing) controlled by an exhaust VVT mechanism 3000 provided to exhaust camshaft 1130.

In the present embodiment, intake camshaft 1120 and exhaust camshaft 1130 are rotated by the VVT mechanisms to control respective phases of intake valve 1100 and exhaust valve 1110. Here, the phase control method is not limited to the one described above.

Figure 3:
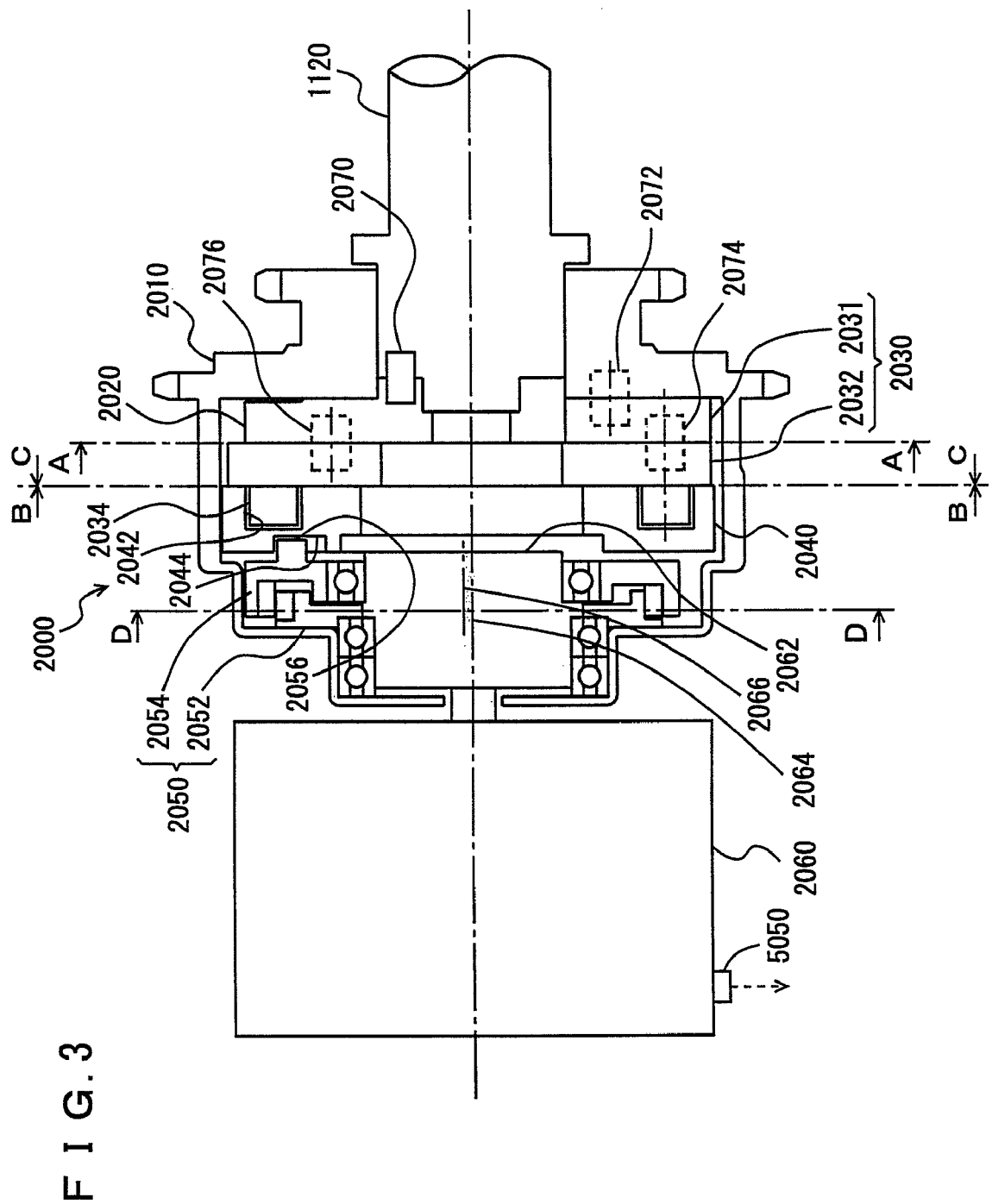
FIG. 3 is a cross section showing an intake VVT mechanism.

Intake VVT mechanism 2000 is operated by an electric motor 2060 (shown in FIG. 3). Electric motor 2060 is controlled by an Electronic Control Unit (ECU) 4000. The current and voltage of electric motor 2060 are detected by an ammeter (not shown) and a voltmeter (not shown) and the measurements are input to ECU 4000.

Exhaust VVT mechanism 3000 is hydraulically operated. Here, intake VVT mechanism 2000 may be hydraulically operated while exhaust VVT mechanism 3000 may be operated by an electric motor.

To ECU 4000, signals indicating the rotation speed and the crank angle of crankshaft 1090 are input from a crank angle sensor 5000. Further, to ECU 4000, signals indicating respective phases of intake camshaft 1120 and exhaust camshaft 1130 (phase: the camshaft position in the rotational direction) are input from a cam position sensor 5010.

Furthermore, to ECU 4000, a signal indicating the water temperature (coolant temperature) of engine 1000 from a coolant temperature sensor 5020 as well as a signal indicating the quantity of intake air (quantity of air taken or sucked into engine 1000) of engine 1000 from an airflow meter 5030 are input.

Based on these signals input from the sensors as well as a map and a program stored in a memory (not shown), ECU 4000 controls the throttle opening position, the ignition timing, the fuel injection timing, the quantity of injected fuel, the phase of intake valve 1100 and the phase of exhaust valve 1110, for example, so that engine 1000 is operated in a desired operating state.

Figure 2:
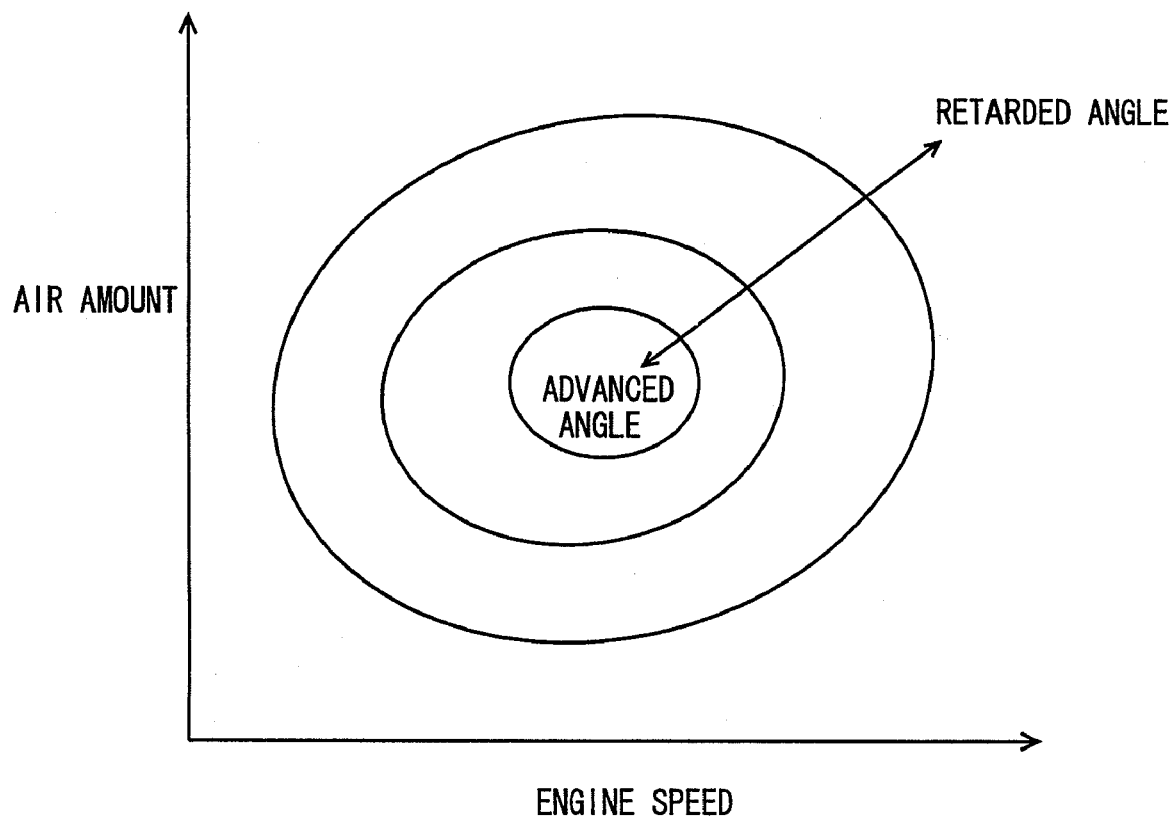
FIG. 2 shows a map defining the phase of an intake camshaft.

In the present embodiment, ECU 4000 determines the phase of intake valve 1100 based on the map as shown in FIG. 2 that uses the engine speed NE and the intake air quantity KL as parameters. A plurality of maps for respective coolant temperatures are stored for determining the phase of intake valve 1100.

In the following, a further description is given of intake VVT mechanism 2000. Here, exhaust VVT mechanism 3000 may have the same configuration as that of intake VVT mechanism 2000 as described below, or each of intake VVT mechanism 2000 and exhaust VVT mechanism 3000 may have the same configuration as that of intake VVT mechanism 2000 as described below.

As shown in FIG. 3, intake VVT mechanism 2000 includes a sprocket 2010, a cam plate 2020, a link mechanism 2030, a guide plate 2040, reduction gears 2050, and electric motor 2060.

Sprocket 2010 is coupled via a chain or the like to crankshaft 1090. The rotation speed of sprocket 2010 is half the rotation speed of crankshaft 1090, as in the case of intake camshaft 1120 and exhaust camshaft 1130. Intake camshaft 1120 is provided concentrically with the rotational axis of sprocket 2010 and rotatable relative to sprocket 2010.

Cam plate 2020 is coupled to intake camshaft 1120 with a pin (1) 2070. Cam plate 2020 rotates, in sprocket 2010, together with intake camshaft 1120. Here, cam plate 2020 and intake camshaft 1120 may be integrated into one unit.

Figure 4:
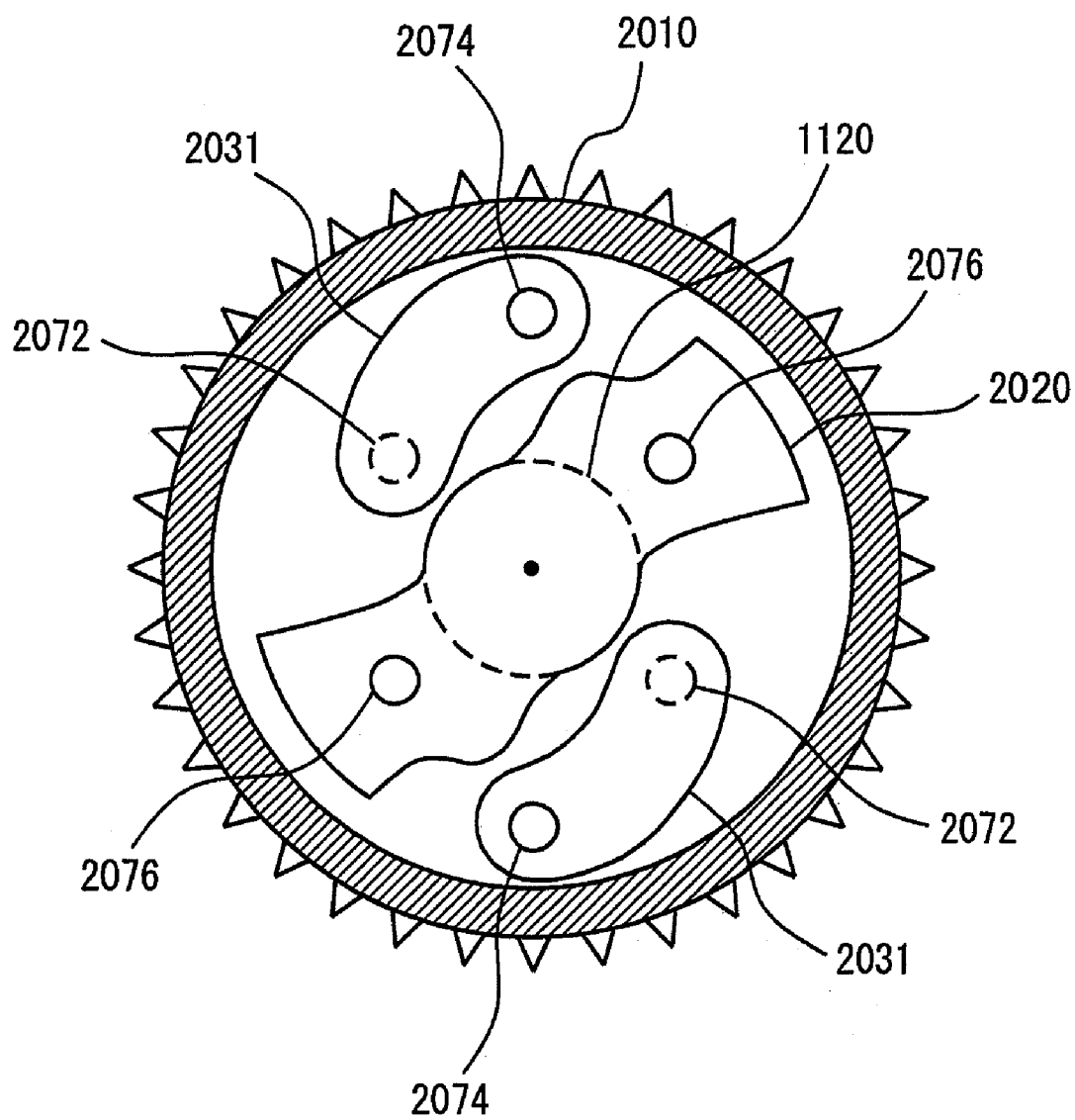
FIG. 4 is a cross section along A-A in FIG. 3.

Link mechanism 2030 is comprised of an arm (1) 2031 and an arm (2) 2032. As shown in FIG. 4, which is a cross section along A-A in FIG. 3, a pair of arms (1) 2031 is provided within sprocket 2010 so that the arms are point symmetric to each other with respect to the rotational axis of intake camshaft 1120. Each arm (1) 2031 is coupled to sprocket 2010 so that the arm can swing about a pin (2) 2072.

Figure 5:
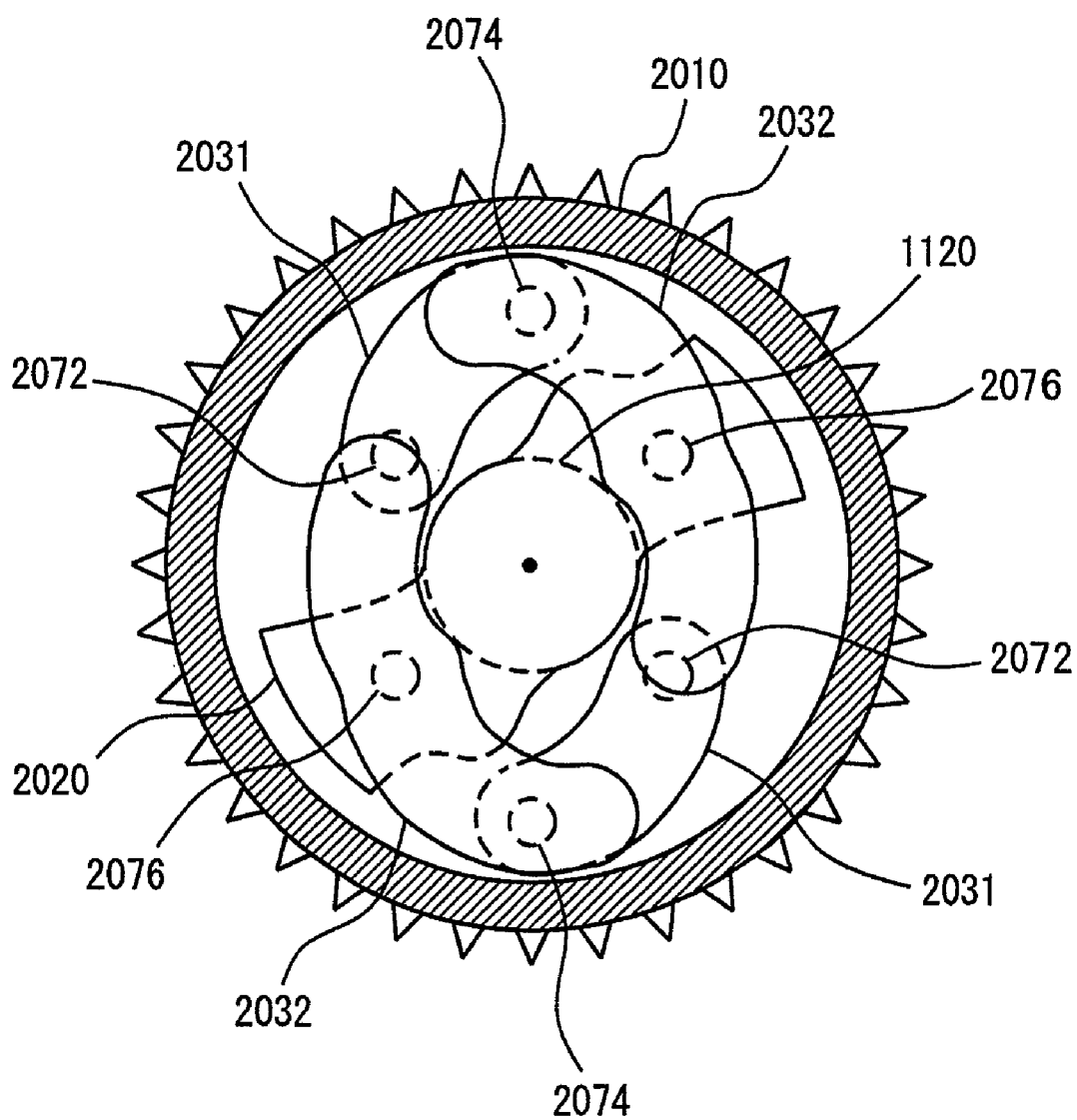
FIG. 5 is a (first) cross section along B-B in FIG. 3.
Figure 6:
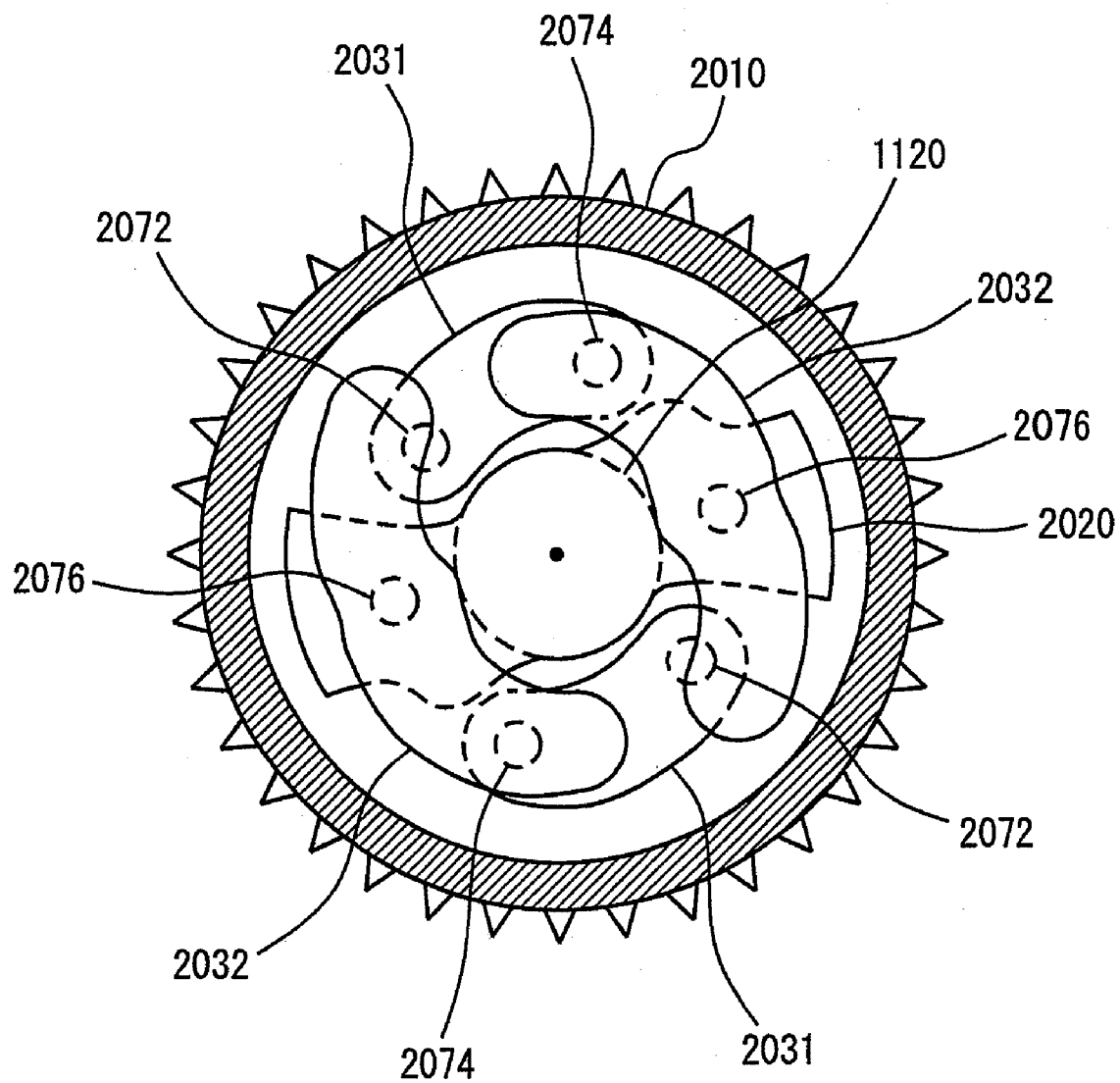
FIG. 6 is a (second) cross section along B-B in FIG. 3.

As shown in FIG. 5, which is a cross section along B-B in FIG. 3, and as shown in FIG. 6 showing the state where the phase of intake valve 1100 is advanced with respect to the state in FIG. 5, arms (1) 2031 and cam plate 2020 are coupled by arms (2) 2032.

Arm (2) 2032 is supported such that the arm can swing about a pin (3) 2074 and with respect to arm (1) 2031. Further, arm (2) 2032 is supported such that the arm can swing about a pin (4) 2076 and with respect to cam plate 2020.

A pair of link mechanisms 2030 causes intake camshaft 1120 to rotate relative to sprocket 2010 and thereby changes the phase of intake valve 1100. Thus, even if one of the paired link mechanisms 2030 should be damaged or broken, the other link mechanism can be used to change the phase of intake valve 1100.

Referring back to FIG. 3, at a surface of each link mechanism 2030 (arm (2) 2032) that is a surface facing guide plate 2040, a control pin 2034 is provided. Control pin 2034 is provided concentrically with pin (3) 2074. Each control pin 2034 slides in a guide groove 2042 provided in guide plate 2040.

Each control pin 2034 slides in guide groove 2042 of guide plate 2040, to be shifted in the radial direction. The radial shift of each control pin 2034 causes intake camshaft 1120 to rotate relative to sprocket 2010.

Figure 7:
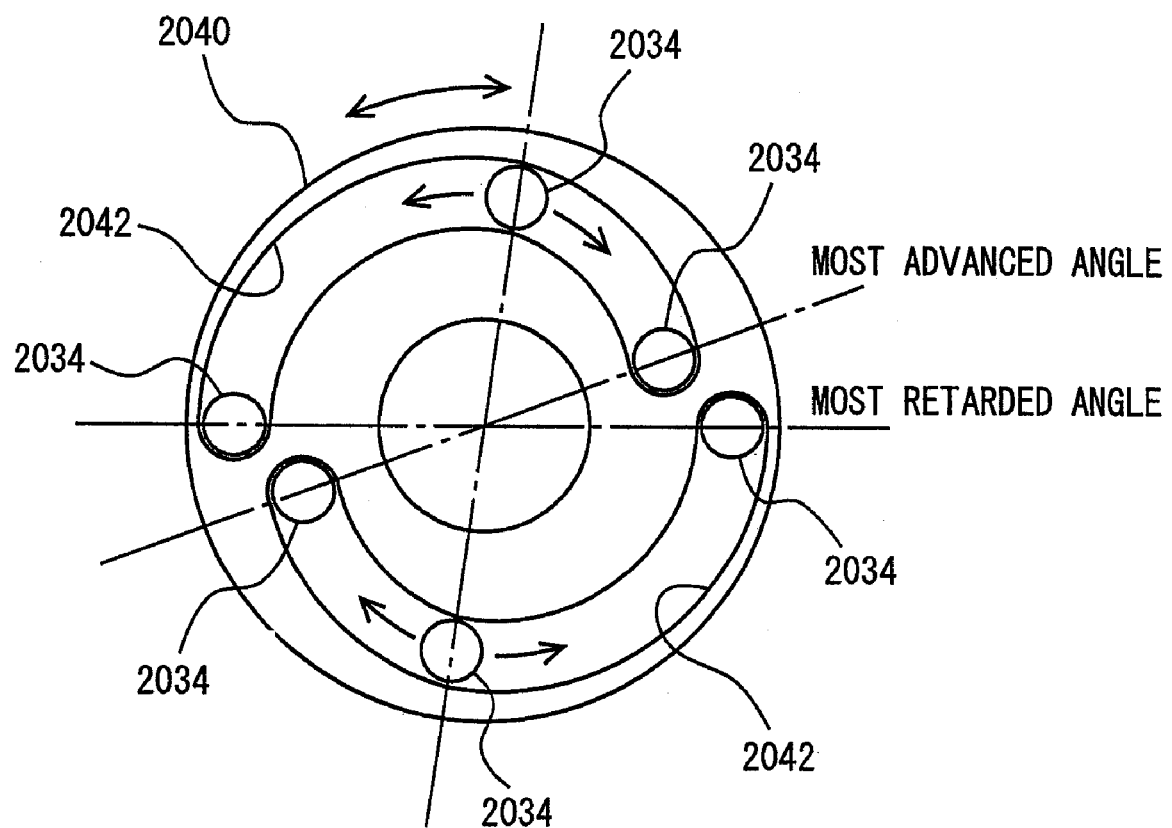
FIG. 7 is a cross section along C-C in FIG. 3.

As shown in FIG. 7, which is a cross section along C-C in FIG. 3, guide groove 2042 is formed in the spiral shape so that rotation of guide plate 2040 causes each control pin 2034 to shift in the radial direction. Here, the shape of guide groove 2042 is not limited to this.

As control pin 2034 is shifted further in the radial direction from the axial center of guide plate 2040, the phase of intake valve 1100 is retarded to a greater extent. In other words, the amount of change of the phase has a value corresponding to the operation amount of link mechanism 2030 generated by the radial shift of control pin 2034. Alternatively, the phase of intake valve 1100 may be advanced to a greater extent as control pin 2034 is shifted further in the radial direction from the axial center of guide plate 2040.

As shown in FIG. 7, when control pin 2034 abuts on an end of guide groove 2042, the operation of link mechanism 2030 is restrained. Therefore, the phase in which control pin 2034 abuts on an end of guide groove 2042 is the phase of the most retarded angle or the most advanced angle.

Referring back to FIG. 3, in guide plate 2040, a plurality of depressed portions 2044 are provided in its surface facing reduction gears 2050, for coupling guide plate 2040 and reduction gears 2050 to each other.

Reduction gears 2050 are comprised of an outer teeth gear 2052 and an inner teeth gear 2054. Outer teeth gear 2052 is fixed with respect to sprocket 2010 so that the gear rotates together with sprocket 2010.

Inner teeth gear 2054 has a plurality of protruded portions 2056 thereon that are received in depressed portions 2044 of guide plate 2040. Inner teeth gear 2054 is supported rotatably about an eccentric axis 2066 of a coupling 2062 formed eccentrically with respect to an axial center 2064 of an output shaft of electric motor 2060.

Figure 8:
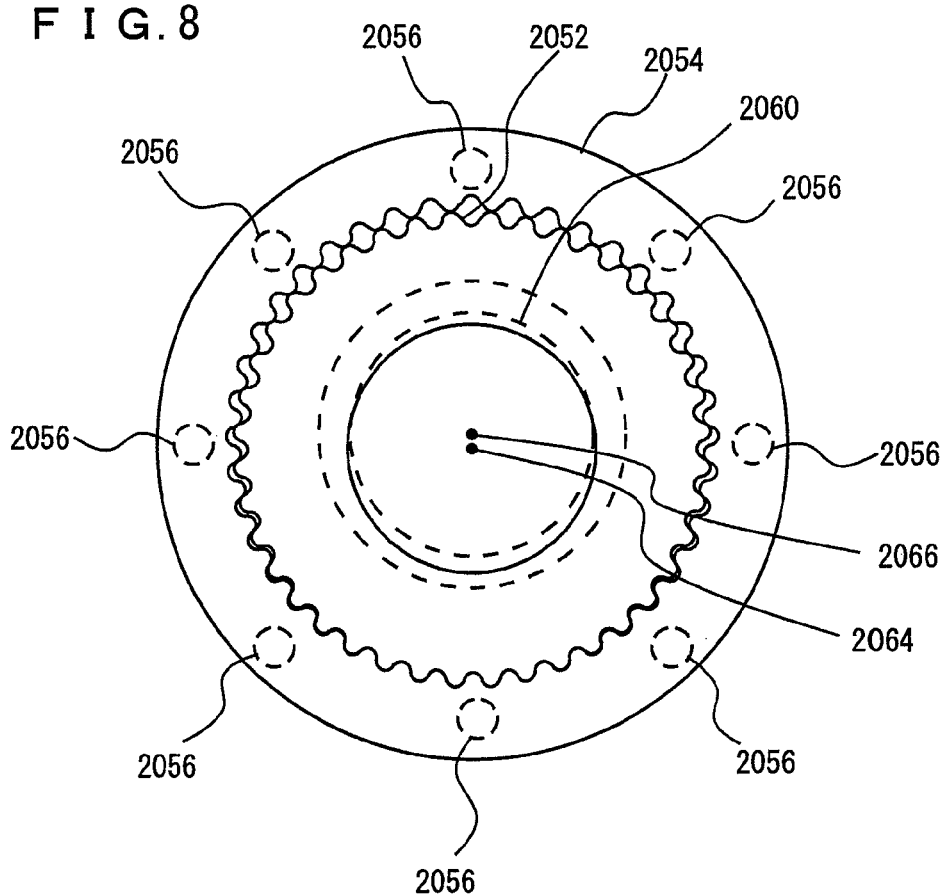
FIG. 8 is a cross section along D-D in FIG. 3.

FIG. 8 shows a cross section along D-D in FIG. 3. Inner teeth gear 2054 is provided such that a part of the teeth thereof meshes with outer teeth gear 2052. When the rotation speed of the output shaft of electric motor 2060 is identical to the rotation speed of sprocket 2010, coupling 2062 and inner teeth gear 2054 rotate at the same rotation speed as that of outer teeth gear 2052 (sprocket 2010). In this case, guide plate 2040 rotates at the same rotation speed as that of sprocket 2010 and accordingly the phase of intake valve 1100 is maintained.

When electric motor 2060 causes coupling 2062 to rotate about axial center 2064 and relative to outer teeth gear 2052, inner teeth gear 2054 as a whole accordingly revolves about axial center 2064 while inner teeth gear 2054 rotates about eccentric axis 2066. The rotational motion of inner teeth gear 2054 causes guide plate 2040 to rotate relative to sprocket 2010 and thus the phase of intake valve 1100 is changed.

The phase of intake valve 1100 is changed by reduction of the rotation speed of relative rotation between the output shaft of electric motor 2060 and sprocket 2010 (operation amount of electric motor 2060) by reduction gears 2050, guide plate 2040 and link mechanism 2030. Here, the rotation speed of relative rotation between the output shaft of electric motor 2060 and sprocket 2010 may be increased to change the phase of intake valve 1100. On the output shaft of electric motor 2060, a motor rotation angle sensor 5050 is provided, which outputs a signal indicating an angle of rotation (position of the output shaft in the rotating direction) of the output shaft. Motor rotation angle sensor 5050 is generally configured to generate a pulse signal every time the output shaft of electric motor rotates by a prescribed angle. Based on the output of motor rotation angle sensor 5050, the rotation speed of the output shaft of electric motor 2060 (hereinafter also simply referred to as rotation speed of electric motor 2060) can be detected.

Figure 9:
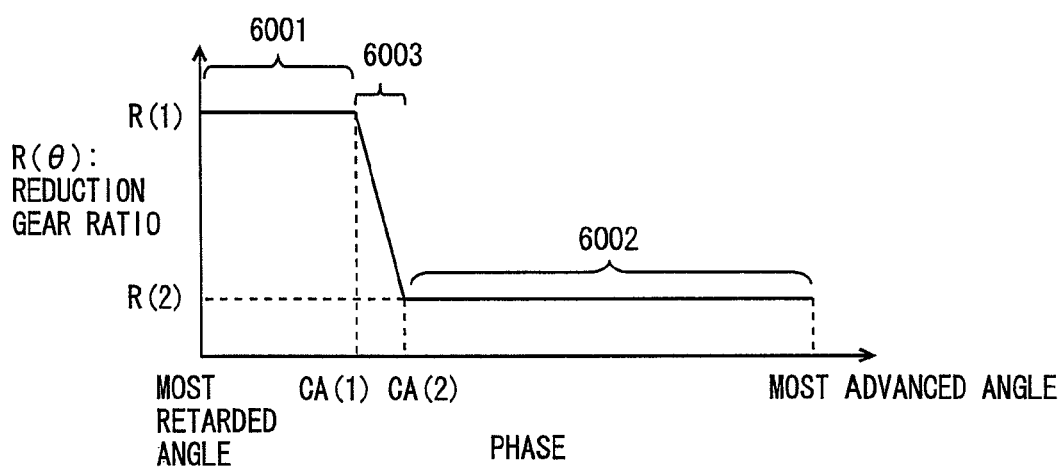
FIG. 9 shows the reduction gear ratio of the intake VVT mechanism as a whole.

As shown in FIG. 9, the reduction gear ratio R(θ) of intake VVT mechanism 2000 as a whole, that is, the ratio of rotation speed of relative rotation between the output shaft of electric motor 2060 and sprocket 2010 to the amount of phase-change, may have a value according to the phase of intake valve 1100. In the present embodiment, as the reduction gear ratio R(θ) is higher, the amount of phase-change with respect to the rotation speed of relative rotation between the output shaft of electric motor 2060 and sprocket 2010 is smaller.

In the case where the phase of intake valve 1100 is in a first region (6001) from the most retarded angle to CA (1), the reduction gear ratio of intake VVT mechanism 2000 as a whole is R (1). In the case where the phase of intake valve 1100 is in a second region (6002) from CA (2) (CA (2) is advanced with respect to CA (1)) to the most advanced angle, the reduction gear ratio of intake VVT mechanism 2000 as a whole is R (2)(R (1)>R (2)).

In the case where the phase of intake valve 1100 is in a third region (6003) from CA (1) to CA (2), the reduction gear ratio of intake VVT mechanism 2000 as a whole changes at a predetermined rate of change ((R (2)-R (1))/(CA (2)-CA (1)).

Based on the configuration as described above, intake VVT mechanism 2000 of the variable valve timing apparatus of the present embodiment functions as described below.

When the phase of intake valve 1100 (intake camshaft 1120) is to be advanced, electric motor 2060 is operated to rotate guide plate 2040 relative to sprocket 2010, thereby advancing the phase of intake valve 1100 as shown in FIG. 10.

When the phase of intake valve 1100 is in the first region between the most retarded angle and CA (1), the rotation speed of relative rotation between the output shaft of electric motor 2060 and sprocket 2010 is reduced at reduction gear ratio R (1) and the phase of intake valve 1100 is advanced.

In the case where the phase of intake valve 1100 is in the second region between CA (2) and the most advanced angle, the rotation speed of relative rotation between the output shaft of electric motor 2060 and sprocket 2010 is reduced at reduction gear ratio R (2) and the phase of intake valve 1100 is advanced.

When the phase of intake valve 1100 is to be retarded, the output shaft of electric motor 2060 is rotated relative to sprocket 2010 in the direction opposite to the direction when the phase thereof is to be advanced. As in the case of advancing the phase, when the phase is to be retarded and the phase of intake valve 1100 is in the first region between the most retarded angle and CA (1), the rotation speed of relative rotation between the output shaft of electric motor 2060 and sprocket 2010 is reduced at reduction gear ratio R (1) and the phase is retarded. Further, when the phase of intake valve 1100 is in the second region between CA (2) and the most advanced angle, the rotation speed of relative rotation between the output shaft of electric motor 2060 and sprocket 2010 is reduced at reduction gear ratio R (2) and the phase is retarded.

Accordingly, as long as the direction of the relative rotation between the output shaft of electric motor 2060 and sprocket 2010 is the same, the phase of intake valve 1100 can be advanced or retarded for both of the first region between the most retarded angle and CA (1) and the second region between CA (2) and the most advanced angle. Here, for the second region between CA (2) and the most advanced angle, the phase can be more advanced or more retarded. Thus, the phase can be changed over a wide range.

Further, since the reduction gear ratio is high for the first region (6001) between the most retarded angle and CA (1), a large torque is necessary, for rotating the output shaft of electric motor 2060 by a torque acting on intake camshaft 1120 as engine 1000 operates. Therefore, even if electric motor 2060 generates no torque as in the case where electric motor 2060 is stopped, rotation of the output shaft of electric motor 2060 caused by the torque acting on intake camshaft 1120 can be prevented. Therefore, a change of the actual phase from a phase determined under control can be restrained.

As described above, in intake VVT mechanism 2000, as there is the reduction gear ratio R(θ), unintended change in phase is less likely when power supply to electric motor 2060 as the actuator is stopped. This effect is particularly well achieved in the first region that covers the phase of the most retarded angle.

When the phase of intake valve 1100 is in the third region (6003) between CA (1) and CA (2), the rotation speed of relative rotation between the output shaft of electric motor 2060 and sprocket 2010 is reduced at a reduction gear ratio that changes at a predetermined rate of change, which may result in advance or retard in phase of intake valve 1100.

Accordingly, when the phase changes from the first region to the second region or from the second region to the first region, the amount of change of the phase with respect to the rotation speed of relative rotation between the output shaft of electric motor 2060 and sprocket 2010 can be increased or decreased gradually. In this way, a sudden stepwise change of the amount of change in phase can be restrained, to thereby restrain a sudden change in phase. Accordingly, phase controllability can be improved.

As discussed above, in the intake VVT mechanism for the variable valve timing apparatus in the present embodiment, when the phase of the intake valve is in the region from the most retarded angle to CA (1), reduction gear ratio of intake VVT mechanism 2000 as a whole is R (1). When the phase of the intake valve is in the region from CA (2) to the most advanced angle, the reduction gear ratio of intake VVT mechanism 2000 as a whole is R (2), which is lower than R (1). Thus, as long as the rotational direction of the output shaft of the electric motor is the same, the phase of the intake valve can be advanced or retarded for both of the regions, namely the first region between the most retarded angle and CA (1) and the second region between CA (2) and the most advanced angle. Here, for the second region between CA (2) and the most advanced angle, the phase can be advanced or retarded to a greater extent. Therefore, the phase can be changed over a wide range. Further, for the first region between the most retarded angle and CA (1), the reduction gear ratio is high and therefore, it is possible to prevent rotation of the output shaft of the electric motor by the torque acting on the intake camshaft as the engine is operated. Thus, a change of the actual phase from a phase determined under control can be restrained. Accordingly, the phase can be changed over a wide range and the phase can be controlled accurately.

Next, the structure for controlling the phase of intake valve 1100 (hereinafter also simply referred to as the intake valve phase) will be described in detail.

Figure 11:
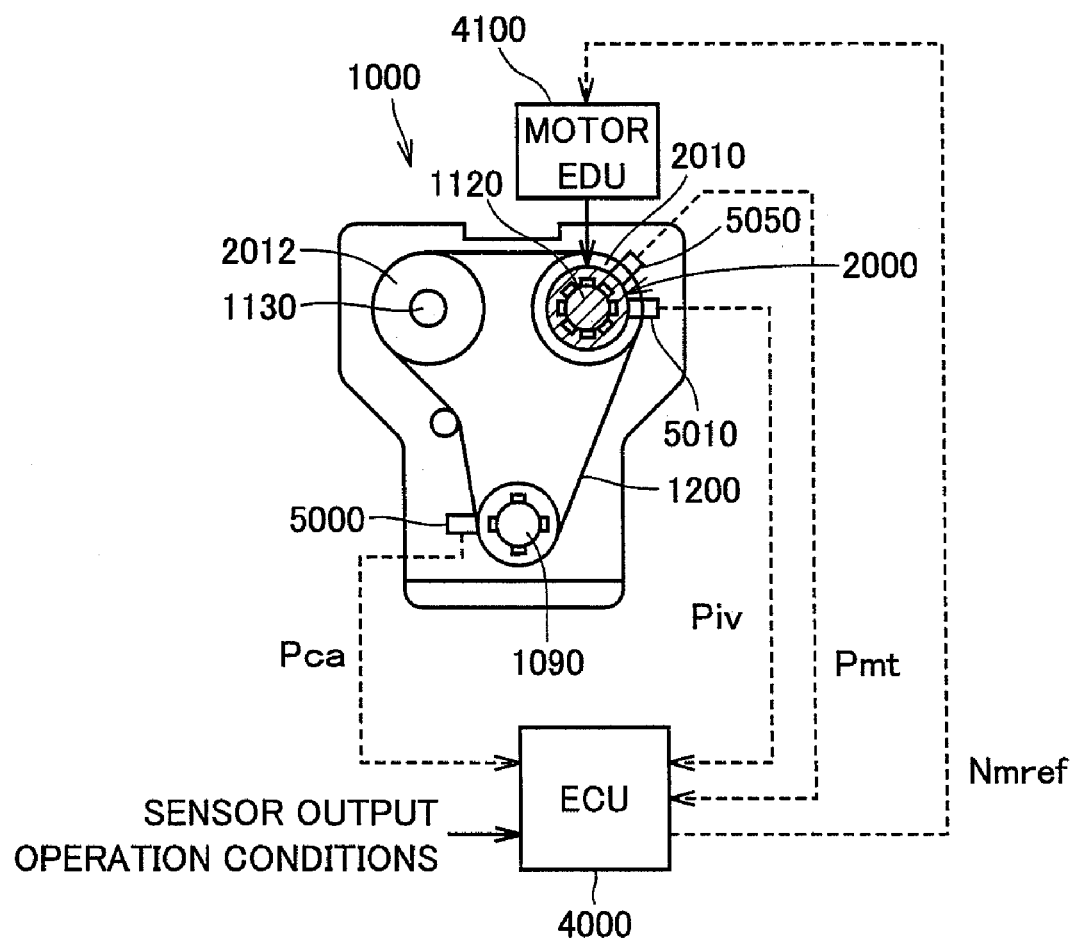
FIG. 11 is a schematic block diagram illustrating a control structure of intake valve phase by the variable valve timing apparatus in accordance with the present embodiment.

Referring to FIG. 11, as already described with reference to FIG. 1, engine 1000 is configured such that power from crankshaft 1090 is transmitted to intake camshaft 1120 and exhaust camshaft 1130 through sprockets 2010 and 2012, respectively, by means of a timing chain 1200 (or a timing belt). Further, on the outer circumferential side of intake camshaft 1120, a cam position sensor 5010 is attached, for outputting a cam angle signal Piv, at every prescribed cam angle. On the outer circumferential side of crankshaft 1090, a crank angle sensor 5000 is attached, for outputting a crank angle signal Pca, at every prescribed crank angle. Further, on a rotor (not shown) of electric motor 2060, a motor rotation angle sensor 5050 is attached, for outputting a motor rotation angle signal Pmt, at every prescribed rotation angle. The cam angle signal Piv, crank angle signal Pca and motor rotation angle signal Pmt are input to ECU 4000.

Further, based on the outputs of sensors detecting the state of engine 1000 and on operation conditions (pedal operation of the driver, current vehicle speed and the like), ECU 4000 controls the operation of engine 1000 so that required output of engine 1000 can be attained. As a part of engine control, ECU 4000 sets phase target values of intake valve 1100 and exhaust valve 1110, based on the map shown in FIG. 2.

Further, ECU 4000 generates a rotation speed command value Nmref of electric motor 2060 as the actuator of intake VVT mechanism 2000 such that the phase of intake valve 1100 reaches the target phase. The rotation speed command Nmref is determined corresponding to the rotation speed of output shaft of electric motor 2060 relative to sprocket 2010 (intake camshaft 1120), as will be described later. The difference in rotation speed of electric motor 2060 relative to intake camshaft 1120 corresponds to the operation amount of actuator. Motor EDU (Electronic Drive Unit) 4100 controls the rotation speed of electric motor 2060, in accordance with the rotation speed command Nmref from ECU 4000.

Figure 12:
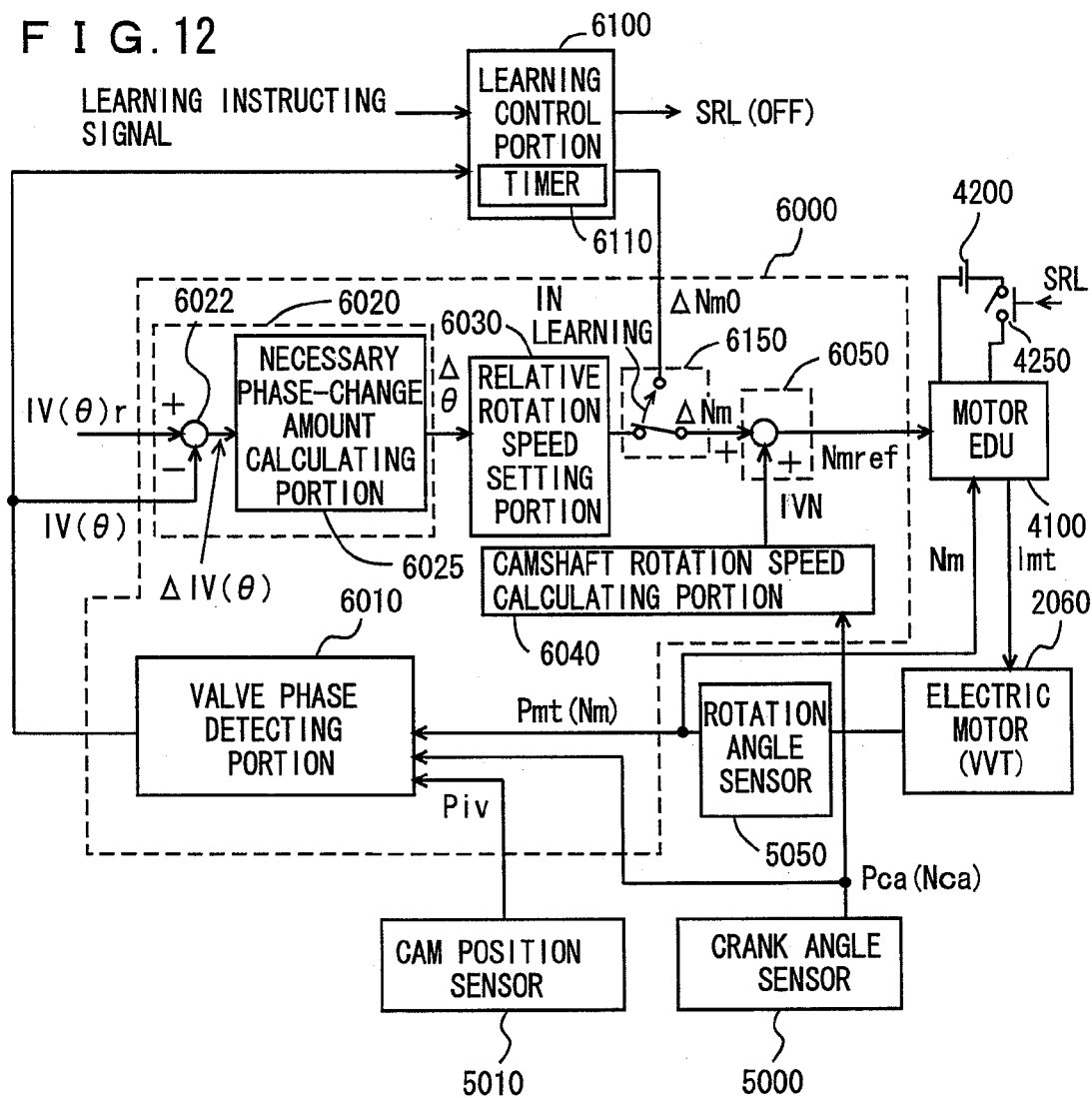
FIG. 12 is a block diagram illustrating rotation speed control of an electric motor as the actuator of the variable valve timing apparatus in accordance with the present embodiment.

FIG. 12 is a block diagram illustrating rotation speed control of electric motor 2060 as the actuator of intake VVT mechanism 2000 in accordance with the present embodiment.

Referring to FIG. 12, an actuator operation amount setting portion 6000 includes a valve phase detecting portion 6010, a camshaft phase-change amount calculating portion 6020, a relative rotation speed setting portion 6030, a camshaft rotation speed detecting portion 6040, a rotation speed command value generating portion 6050, and a switching portion 6150. Further, a learning control portion 6100 is provided, for learning the reference position of the intake valve phase. The operations of actuator operation amount setting portion 6000 and learning control portion 6100 are realized by executing a control process in accordance with a prescribed program stored in advance in ECU 4000 at every prescribed control period.

Valve phase detecting portion 6010 calculates the currently detected intake valve phase IV(θ) (hereinafter also denoted as phase detection value IV(θ)), based on crank angle signal Pca from crank angle sensor 5000, cam angle signal Piv from cam position sensor 5010 and motor rotation angle signal Pmt from rotation angle sensor 5050 of electric motor 2060.

Valve phase detecting portion 6010 may calculate the phase detection value IV(θ) based on crank angle signal Pca and on cam angle signal Piv. By way of example, at the time when cam angle signal Piv is generated, time difference of cam angle signal Piv from the generation of crank angle signal Pca is converted to rotation phase difference between crankshaft 1090 and intake camshaft 1120, whereby the current phase detection value IV(θ) of intake camshaft 1120 may be calculated (first phase calculating method).

Alternatively, in intake VVT mechanism 2000 in accordance with an embodiment of the present invention, it is possible to accurately trace the phase-change amount of intake valve based on the operation amount (relative rotation speed ΔNm) of electric motor 2060 as the actuator. Specifically, based on the outputs of various sensors, the actual relative rotation speed ΔNm is calculated, and by an operation in accordance with expression (1) based on the calculated actual relative rotation speed ΔNm, the amount of change dIV(θ) of the intake valve phase per unit time (control period) can be calculated. Therefore, by accumulating the amount of phase-change dIV(θ), valve phase detecting portion 6010 may calculate the current phase detection value IV(θ) of intake camshaft 1120 successively (second phase calculating method).

Valve phase detecting portion 6010 may calculate the phase detection value IV(θ) by appropriately using the first and second phase calculating methods, in consideration of stability in engine speed or computational load.

Camshaft phase-change amount calculating portion 6020 has a calculating portion 6022 and a necessary phase-change amount calculating portion 6025. Calculating portion 6022 calculates deviation ΔIV(θ) in phase from the target phase IV(θ)r (ΔIV(θ)=IV(θ)−IV(θ)r). Necessary phase-change amount calculating portion 6025 calculates the necessary amount of change Δθ of intake camshaft 1120 of this control period, in accordance with the deviation ΔIV(θ) calculated by calculating portion 6022.

By way of example, the maximum value Δθmax of phase-change amount Δθ in a single control period is set in advance, and necessary phase-change amount calculating portion 6025 determines the phase-change amount Δθ in accordance with the phase deviation ΔIV(θ) within the range up to the maximum value Δθmax. Here, the maximum value Δθmax may be a prescribed fixed value, or it may be variably set by necessary phase-change amount calculating portion 6025 in accordance with the state of operation (rotation speed, amount of intake air and the like) of engine 1000 or the magnitude of phase deviation ΔIV(θ)

Relative rotation speed setting portion 6030 calculates relative rotation speed ΔNm of the output shaft of electric motor 2060 relative to the rotation speed of sprocket 2010 (intake camshaft 1120), necessary to generate the phase-change amount Δθ calculated by necessary phase-change amount calculating portion 6025. By way of example, the relative rotation speed ΔNm is set to a positive value (ΔNm>0) when the intake valve phase is to be advanced, set to a negative value (ΔNm<0) when the intake valve phase is to be retarded, and set to approximately zero (ΔNm=0) when the current intake valve phase is to be maintained (Δθ=0).

Here, the relation between the phase-change amount Δθ per unit time ΔT corresponding to the control period and the relative rotation speed ΔNm is represented by the following expression (1). In expression (1), R(θ) represents reduction gear ratio that changes in accordance with the intake valve phase, shown in FIG. 9.

$$\Delta\theta \propto \Delta Nm \cdot 360° \cdot (1/R(\theta)) \cdot \Delta T \qquad (1)$$

Therefore, relative rotation speed setting portion 6030 may calculate the relative rotation speed ΔNm of electric motor 2060 for generating the camshaft phase-change amount Δθ required in control period ΔT, in accordance with an operation of expression (1).

Camshaft rotation speed detecting portion 6040 calculates the rotation speed of sprocket 2010, that is, the actual rotation speed IVN of intake camshaft 1120 as one-half the rotation speed of crankshaft 1090. Camshaft rotation speed detecting portion 6040 may be configured to calculate the actual rotation speed IVN of intake camshaft 1120 based on the cam angle signal Piv from cam position sensor 5010. Generally, however, the number of cam angle signals output per one rotation of intake camshaft 1120 is smaller than the number of crank angle signals output per one rotation of crankshaft 1090. Therefore, by detecting the camshaft rotation speed IVN based on the rotation speed of crankshaft 1090, detection accuracy can be improved.

Switching portion 6150 is arranged between rotation speed command value generating portion 6050 and relative rotation speed setting portion 6030 and learning control portion 6100. Switching portion 6150 inputs the relative rotation speed ΔNm set by relative rotation speed setting portion 6030 to rotation speed command value generating portion 6050 except when the reference position learning by learning control portion 6100 is being executed. The reference position learning in accordance with the present embodiment will be described in detail later.

Rotation speed command value generating portion 6050 adds the actual rotation speed IVN of intake camshaft 1120 detected by camshaft rotation speed detecting portion 6040 and the relative rotation speed ΔNm input from switching portion 6150 to generate rotation speed command value Nmref of electric motor 2060. Therefore, during operations including the normal operation, other than at the time of reference position learning, the rotation speed command value Nmref of electric motor 2060 is generated based on the relative rotation speed ΔNm set by relative rotation speed setting portion 6030. At the time of reference position learning, the rotation speed command value Nmref of electric motor 2060 is generated based on the relative rotation speed ΔNm0 set by learning control portion 6100. The rotation speed command value Nmref generated by rotation speed command value generating portion 6050 is transmitted to motor EDU 4100.

Motor EDU 4100 is connected to a power source 4200 through a relay circuit 4250. On/off of relay circuit 4250 is controlled by a control signal SRL. Generally, power source 4200 is formed by a secondary battery that can be charged when the engine operates. Therefore, by turning off the relay circuit, power supply to electric motor 2060 can be stopped.

Motor EDU 4100 executes rotation speed control such that the rotation speed of electric motor 2060 matches the rotation speed command value Nmref. By way of example, motor EDU 4100 controls switching of a power semiconductor device (such as a transistor) such that the power supplied to electric motor 2060 (as represented by motor current Imt) from a power source 4200 is controlled in accordance with deviation in rotation speed (Nref−Nm) of actual rotation speed Nm of electric motor 2060 from the rotation speed command value Nmref. Specifically, the duty ratio of switching operation of such power semiconductor device is controlled. It is noted that the power supply to electric motor 2060 can be stopped by control of motor EDU 4100.

Particularly, in order to improve motor controllability, motor EDU 4100 controls duty ratio DTY as the amount of adjustment in rotation speed control in accordance with the following equation (2).

$$DTY = DTY(ST) + DTY(FB) \quad (2)$$

In Equation (2), DTY(FB) is a feedback term based on the deviation in rotation speed mentioned above and a control operation (typically, general P control, PI control or the like) with a prescribed control gain.

In Equation (2), DTY(ST) is a preset term set based on the rotation speed command value Nmref of electric motor 2060 and the set relative rotation speed ΔNm.

Figure 13:
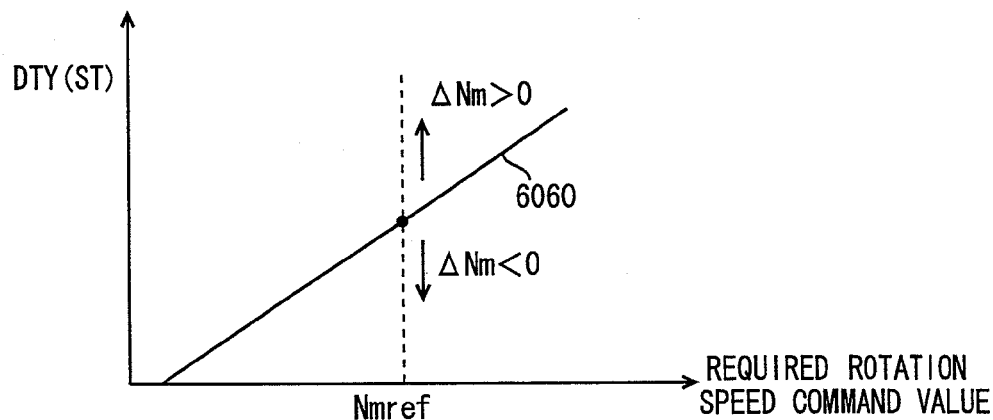
FIG. 13 is a schematic diagram representing speed control of the electric motor.

Referring to FIG. 13, duty ratio characteristic 6060 corresponding to the motor current value required when relative rotation speed ΔNm=0, that is, when electric motor 2060 is to be rotated at the same rotation speed as that of sprocket 2060 with respect to rotation speed command value Nmref (ΔNm=0), is set in advance as a table. Then, DTY(ST) in Equation (2) is set by relative addition/subtraction of a current value corresponding to the relative rotation speed ΔNm to/from the reference value in accordance with duty ratio characteristic 6060. By such rotation speed control that the power supply to electric motor 2060 is controlled by the combination of preset term and feedback term, motor EDU 4100 allows the rotation speed of electric motor 2060 to quickly follow any change in rotation speed command value Nmref, as compared with the rotation speed control simply by the term DTY(FB) of Equation (2).

Reference Position Learning in Accordance with an Embodiment of the Present Invention In order to improve accuracy in detecting the phase of intake camshaft 1120, intake VVT mechanism 2000 performs reference position learning of the intake valve phase, using learning control portion 6100, when prescribed conditions instructing learning are satisfied. In the present embodiment of the invention, the reference position learning is done by causing the intake valve phase to reach the most retarded angle.

Referring to FIG. 12, learning control portion 6100 executes the reference position learning in response to a learning instructing signal that is turned "on" when prescribed conditions instructing learning are satisfied. Learning control portion 6100 is formed to include a timer 6110 that measures time lapse from the start of the learning operation, in response to turning "on" of the learning instructing signal.

At the time of reference position learning, learning control portion 6100 sets relative rotation speed ΔNm0 of electric motor 2060, as the actuator operation amount for performing the reference position learning. At the time of reference position learning, switching portion 6150 inputs the output of learning control portion 6100 to rotation speed command value generating portion 6050, and therefore, based on the relative rotation speed ΔNm0 set by learning control portion 6100, the rotation speed command value Nmref of electric motor 2060 is generated.

During reference position learning in which electric motor 2060 operates in accordance with the relative rotation speed ΔNm0, learning control portion 6100 determines whether the intake valve phase has reached the most retarded angle (for example, 0°) as the reference phase, based on the phase detection value IV(θ) detected by valve phase detecting portion 6010.

When it is detected that the intake valve phase has reached the reference phase, learning control portion 6100 ends the learning operation, and sets the phase detection value IV(θ) at that time as phase learning value θ ln. The phase learning value θ ln obtained in this manner is thereafter used for valve timing control.

By way of example, valve timing is controlled regarding the relative difference between the phase detecting value IV(θ) obtained by valve phase detecting portion 6010 and the phase learning value θ ln described above as the difference between the actual intake valve phase and the reference phase (that is, 0°) at the time of reference position learning. Specifically, the phase learning value θ ln is reflected on the calculation of phase deviation ΔIV(θ) at calculating portion 6022.

Figure 14:
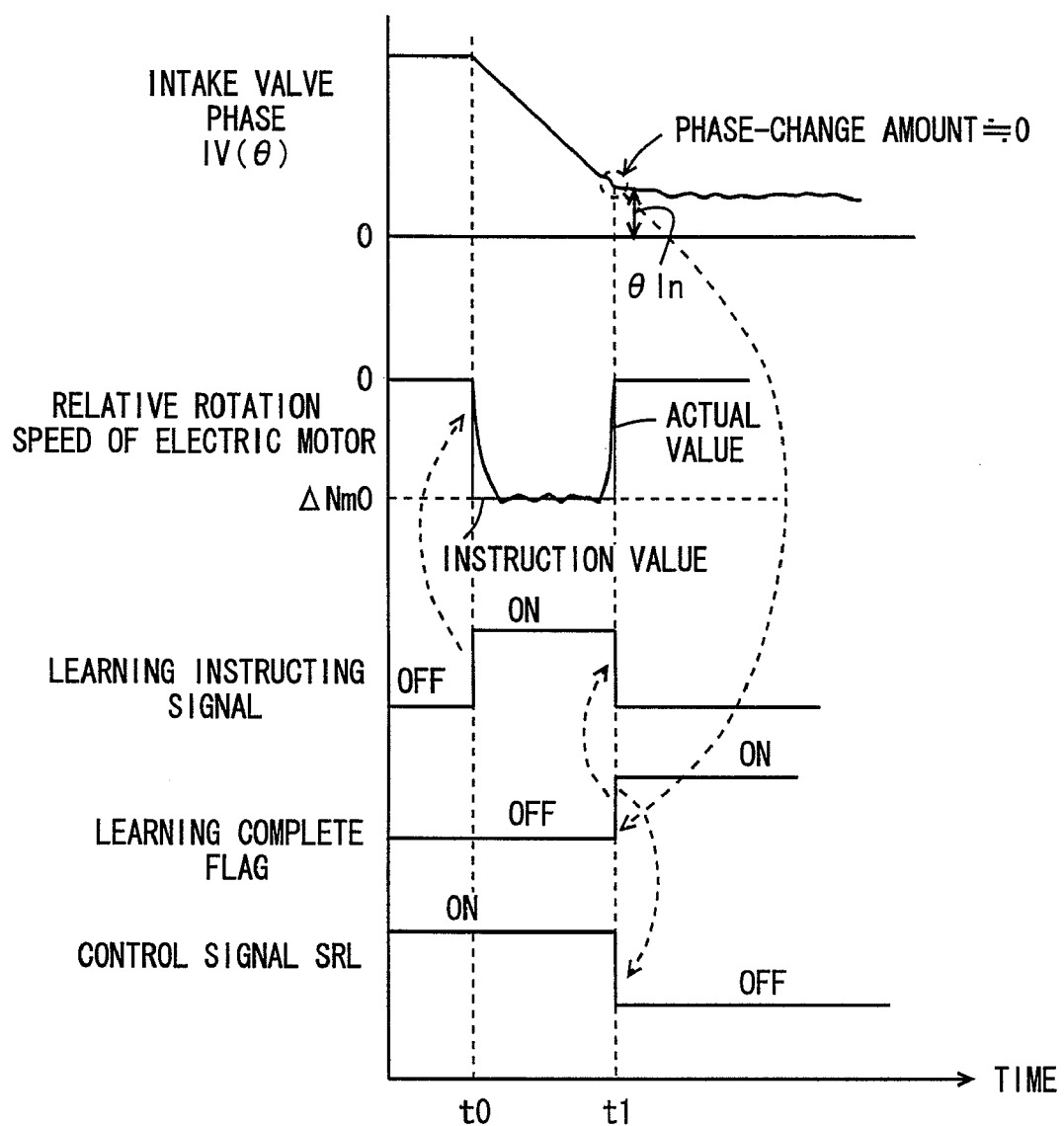
FIG. 14 is a diagram of operation waveforms when the reference position learning is terminated normally in accordance with an embodiment of the present invention.
Figure 15:
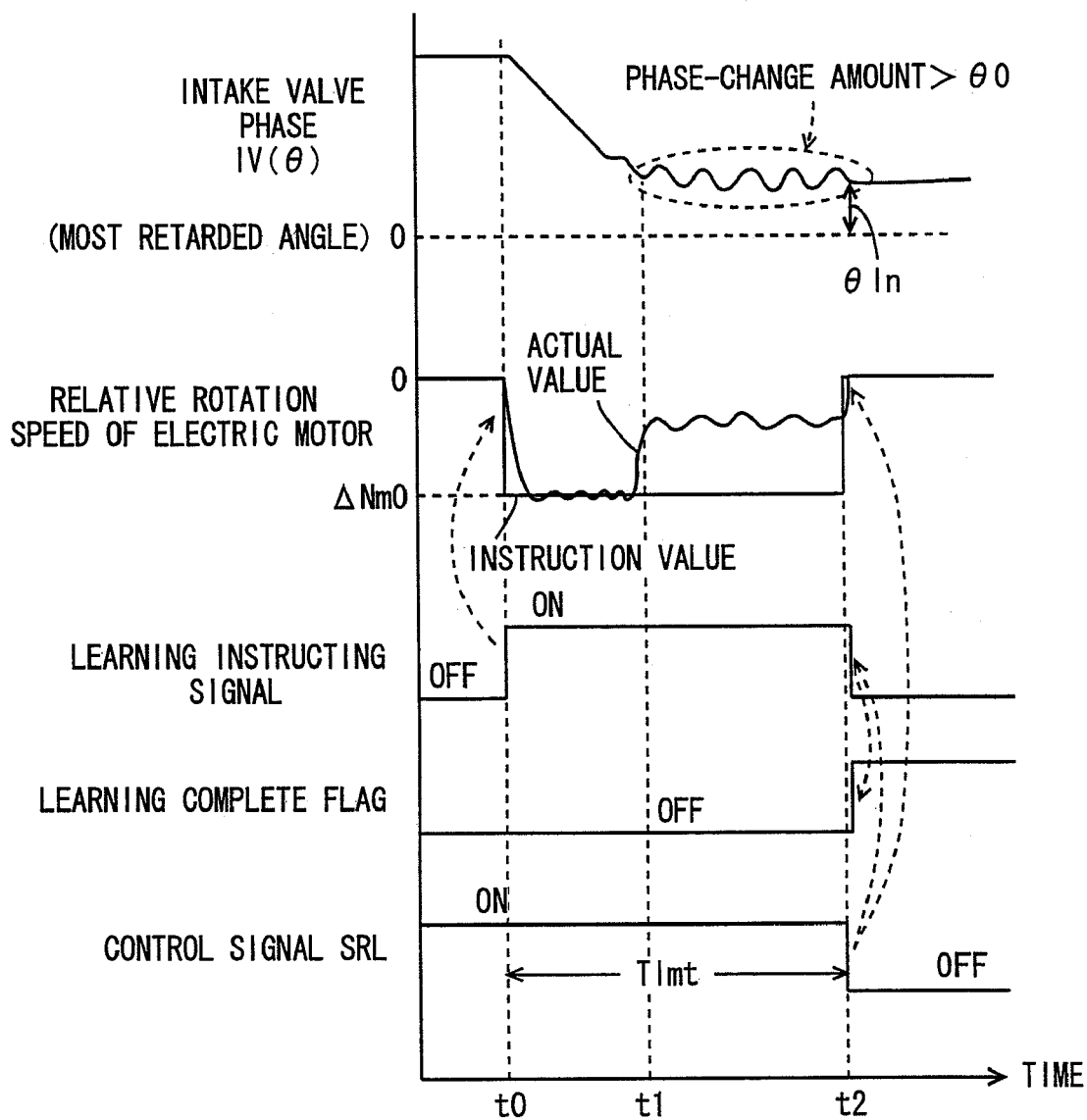
FIG. 15 is a diagram of operation waveforms when the reference position learning is terminated forcibly in accordance with an embodiment of the present invention.

FIGS. 14 and 15 show operation waveforms at the time of reference position learning in accordance with the present embodiment. FIG. 14 shows the operation waveforms when the learning is terminated normally, while FIG. 15 shows operation waveforms when the learning is terminated forcibly.

Referring to FIG. 14, when the conditions for executing learning are satisfied and the learning instructing signal is turned "on" at time point t0, the learning operation starts, and electric motor 2060 operates in accordance with relative rotation speed command value ΔNm0 (<0), whereby the phase detection value IV(θ) is retarded at a constant rate.

When the actual intake valve phase attains to the most retarded angle (0°) at time point t1, operation of link mechanism 2030 is locked, and the amount of change in intake valve phase becomes approximately zero. At this time, the relative rotation speed of electric motor 2060 also becomes approximately zero.

When there is an offset error in the phase detection value IV(θ), the actual intake valve phase reaches the most retarded angle before IV(θ)=0, and further change to the retarded angle becomes impossible. Therefore, the relative rotation speed of electric motor 2060 attains to zero, and the change in phase detection value IV(θ) stops. Therefore, whether the actual intake valve phase has reached the most retarded angle as the reference phase or not can be detected based on the amount of change in phase detecting value IV(θ), or on the amount of change dIV(θ) based on the actual relative rotation speed ΔNm, that is, the value dIV(θ) attaining to dIV(θ)≈0. In response, conditions for terminating the reference position learning are satisfied, and a learning complete flag is turned "on". The phase detection value IV(θ) at this time is stored as the phase learning value θ ln.

Further, in response to completion of reference position learning, the learning operation is terminated, and the relative rotation speed command value of electric motor 2060 is set to zero. Further, the control signal SRL is turned "off" and relay circuit 4250 is turned off.

In contrast, referring to FIG. 15, the learning operation starts at time point t0, and at time point t1, though phase detection value IV(θ) is not zero, the actual intake valve phase comes closer to the most retarded angle. In the example, shown in FIG. 14, however, because of rattling or the like of link mechanism 2030, for example, the actual intake valve phase fluctuates periodically, without fully reaching the most retarded angle. As a result, the phase detecting value IV(θ) fluctuates periodically, not attaining to zero, and the relative rotation speed of electric motor 2060 also fluctuates periodically.

If such a state arises, the conditions for terminating the reference position learning are not satisfied, and therefore, the learning complete flag is not turned "on" and the learning operation continues. While the learning operation continues, electric motor 2060 as the actuator also continuously operates, and hence, power consumption increases and heat caused by the operation builds up.

In order to address such a situation, in the reference position learning in accordance with the present invention, based on the time measurement by timer 6110, at time point t2 when the time lapse from the start of learning operation reaches a prescribed limit time Tlmt, the learning operation is terminated forcibly. In response, the learning complete flag is turned "on", and the relative rotation speed command value of electric motor 2060 that corresponds to the operation amount of the actuator also attains to zero. Further, typically the control signal SRL is turned "off" and relay circuit 4250 is turned off. Therefore, continuous learning operation over the limit time, which may lead to increased power consumption and heat build-up of the actuator, can be prevented.

Figure 16:
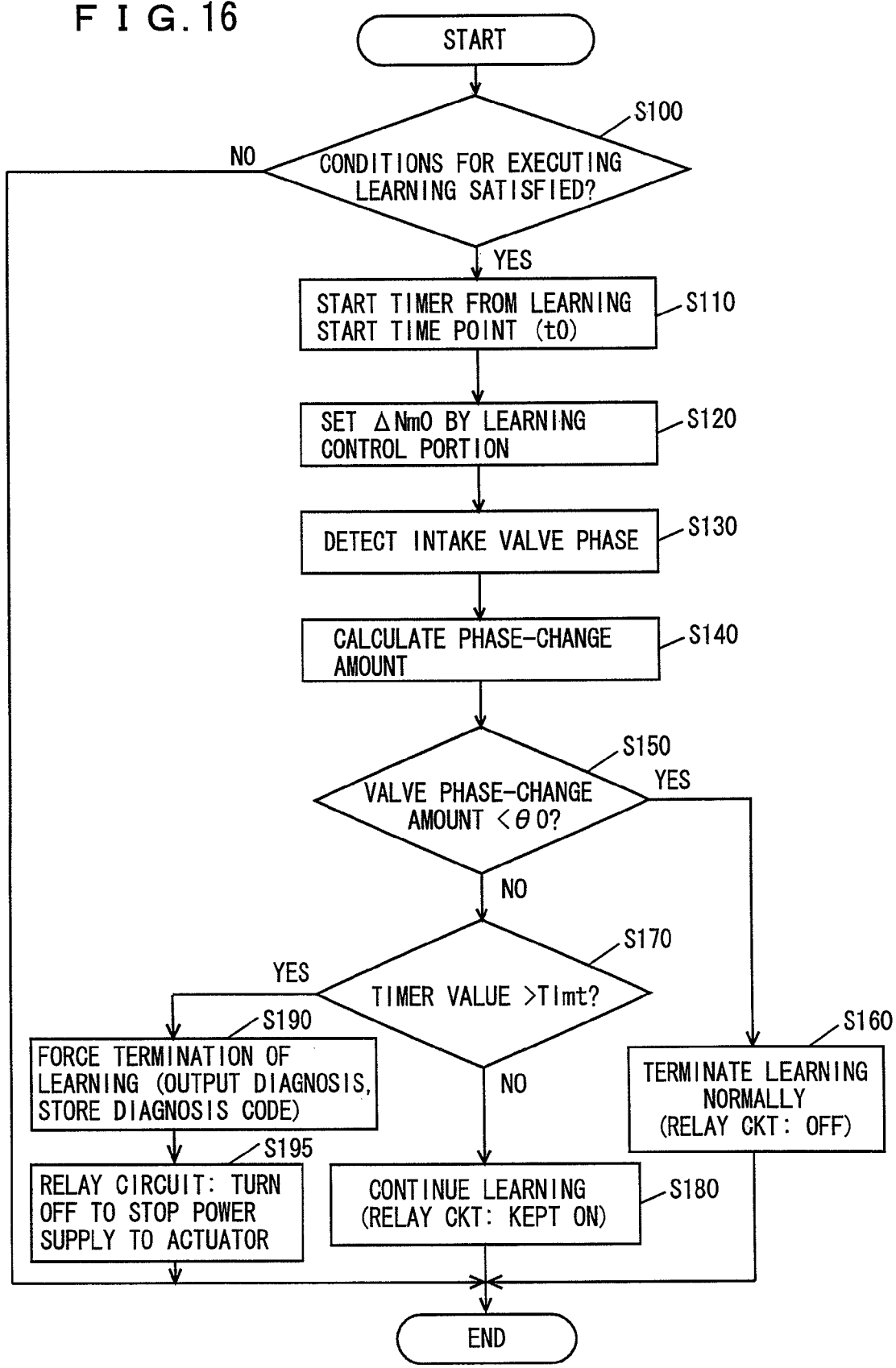
FIG. 16 is a flowchart representing the reference position learning in the variable valve timing apparatus in accordance with an embodiment of the present invention.

FIG. 16 shows an exemplary flowchart for realizing the reference position learning such as shown in FIGS. 14 and 15. The reference position learning routine in accordance with the flowchart of FIG. 16 is executed at every prescribed period, as a part of valve timing control by intake VVT mechanism 2000, by ECU 4000.

Referring to FIG. 14, at step S100, ECU 4000 determines whether prescribed learning execution conditions are satisfied or not. As described with reference to FIG. 9, in intake VVT mechanism 2000 in accordance with the present embodiment, possibility of unintended phase change is low when power supply to electric motor 2060 as the actuator is stopped, because of the reduction gear ratio R(θ). Therefore, by storing the phase detection values IV(θ), which are successively detected in ECU 4000, in a memory area (such as an SRAM: Static Random Access Memory) that retains the stored contents even when the ignition switch is off (when the operation is stopped), it becomes unnecessary to perform the reference position learning every time the engine is started. When such an arrangement is adopted, the conditions for executing learning of step S100 may be satisfied when the contents stored in the memory are cleared, for example, at the time of battery change or the like.

Alternatively, in order to improve accuracy in detecting the intake valve phase, the conditions for executing learning of step S100 may be satisfied every time the engine is started.

When the conditions for executing learning are not satisfied (NO at step S100), ECU 4000 ends the process, as the reference position learning is not instructed.

On the other hand, when the conditions for executing learning are satisfied (YES at step S100), ECU 4000 turns "on" the learning instructing signal input to learning control portion 6100 (FIG. 12), and executes the reference position learning through the steps following step S110.

Then, at step S110, ECU 4000 activates timer 6110 as the learning operation starts. Thus, the time lapse from the start of learning operation, that is, the duration of learning operation is measured.

As the learning operation starts, ECU 4000 sets the relative rotation speed ΔNm0 of electric motor 2060, as the actuator operation amount for performing the reference position learning. The relative rotation speed ΔNm0 is set to a value for changing the intake valve phase to the most retarded angle (0°) as the reference phase. Specifically, in the present embodiment, the relative rotation speed ΔNm0 is set to a prescribed negative value. This corresponds to the operation of learning control portion 6100 in response to turning "on" of the learning instructing signal.

At step S130, ECU 4000 detects a change in the intake valve phase by the operation of electric motor 2060 in accordance with relative rotation speed ΔNm0. This corresponds to calculation of the phase detection value IV(θ) by valve phase detecting portion 6010. ECU 4000 calculates the phase-change amount (step S140) based on the detection of intake valve phase at step S130. This is equivalent to the calculation of phase-change amount dIV(θ), as described above.

Further, at step S150, ECU 4000 compares the phase-change amount calculated at step S140 with a determination value θ0. The determination value θ0 is set to a prescribed value near zero, so as to enable detection that the phase-change amount reached approximately zero.

When the phase-change amount <θ0 (YES at step S150), ECU 4000 determines at step S160 that the actual intake valve phase has reached the reference phase (most retarded angle), and completes reference position learning in a normal manner. Then, ECU 4000 obtains the phase learning value θ ln. Further, typically the relay circuit 4250 is turned off to stop power supply to electric motor 2060. Specifically, at time point t1 of FIG. 14, step S60 is executed.

When the phase-change amount ≧θ0 (NO at step S150), ECU 4000 determines that the actual intake valve phase is not yet reached the reference phase (most retarded angle), and at step S170, ECU 4000 compares the time measured by timer 6110, that is, the time of execution (duration) of the learning operation, with a prescribed limit time Tlmt. The limit time Tlmt is determined, for instance, by experimentally confirming the amount of heat build-up at electric motor 2060 in advance, from the viewpoint of protecting the apparatus. Alternatively, the limit time Tlmt may be set as a variable value in consideration of the relative rotation speed ΔNm at the time of reference position learning and the reduction gear ratio, based on the phase detection value IV(θ) at the start of reference position learning.

When the time of executing the learning operation (duration) is shorter than the limit time Tlmt (NO at step S170), at step S180, ECU 4000 continues the reference position learning, by continuously supplying power to electric motor 2060. Specifically, between time points t0 and t1 of FIG. 14 and between time points t0 to t2 of FIG. 15, step S180 is executed.

When the time of executing the learning operation (duration) exceeds the limit time Tlmt (YES at S170), at step S190, ECU 4000 terminates the reference position learning forcibly. Specifically, at time point t2 of FIG. 15, step S190 is executed.

As shown in FIG. 15, the accuracy of phase learning value θ ln calculated at this time is unclear. Therefore, basically, at the forced termination of reference position learning, the phase learning value θ ln is not updated. Updating of the phase learning value θ ln may be permitted as an exception, however, when the stored contents related to the phase detection value IV(θ) and the phase learning value θ ln are initialized in a memory at the time, for example, of battery exchange.

When the reference position learning does not end normally, there is a concern about mechanical failure of the changing mechanism or degraded mileage caused by lower accuracy in valve timing control. Therefore, at the process of step S190, it is preferred that ECU 4000 gives an alarm (diagnosis monitor or the like) to the passenger, recommending the passenger to inspect the VVT mechanism (variable valve timing apparatus). Further, a piece of information (diagnosis code) may be defined to represent that "the reference position learning of variable valve timing apparatus was not normally terminated," so that it becomes possible to store the diagnosis code together, at the process of step S190, whereby appropriate maintenance becomes possible when the VVT mechanism is inspected.

Further, as the reference position learning is terminated forcibly, at step S195, ECU 4000 typically turns off the relay circuit 4250 to stop power supply to electric motor 2060.

When power supply to electric motor 2060 is stopped in response to the completion of reference position learning (normal termination or forced termination), relay circuit 4250 is again turned on or motor ECU 4100 is controlled to resume the power supply after a prescribed time period or in response to a request of operation to the variable valve timing apparatus. Accordingly, power supply to electric motor 2060 is resumed. In this manner, the valve timing can be controlled based on the intake valve phase reflecting the result of learning, when the reference position learning is terminated normally.

As described above, in the variable valve timing apparatus in accordance with the present embodiment, when the reference position learning cannot be terminated normally within a normal period because of some failure, the learning operation can be terminated forcibly when a preset limit time has passed. Therefore, increase in power consumption and heat build-up of electric motor 2060 as the actuator caused by prolonged reference position learning can be prevented. As a result, it becomes possible to reduce power consumption and to protect the apparatus, at the time of reference position learning.

Further, the reference phase of reference position learning is set to the most retarded angle that is included in the region of large reduction gear ratio. Therefore, at the forced termination of the learning operation, the intake valve phase is near the most retarded angle, that is, in the region of large reduction gear ratio. In such a region, even when power supply to electric motor 2060 is stopped, the intake valve phase at that time can be maintained. Therefore, when the learning operation is terminated forcibly because of the lapse of the limit time, power supply to the actuator is also stopped, whereby wasteful power consumption and heat build-up thereafter can more reliably be prevented.

Particularly, in the state of time point t1 to t2 of FIG. 15, the intake valve phase changes near the most retarded angle, and therefore, electric motor 2060 is intermittently locked, so that the motor current becomes relatively large. Therefore, the effect of reducing power consumption and protecting the apparatus attained by forced termination of the reference position learning and stopping power supply to the actuator is particularly significant.

The reference position may not be the most retarded angle, when a mechanism such as a lock pin is provided for mechanically limiting the change in the intake valve phase at the reference phase at the time of reference position learning. It is possible, however, by setting the reference phase in the reference position learning at the phase corresponding to the limit position of variable range of intake valve phase (most retarded angle/most advanced angle) as in the present embodiment, to execute the reference position learning without adding any special mechanism such as the lock pin.

In the present embodiment, an example of control, in which the reference position learning is terminated forcibly when the time lapse after the start of learning operation, that is, the execution time of the learning operation exceeds the limit time, has been described. In order to attain similar effects from the viewpoint of protecting the apparatus, a control structure may be adopted in which the reference position learning is terminated forcibly in accordance with the temperature of electric motor 2060 or of a power semiconductor device in motor ECU 4100. In such a control structure, however, it becomes necessary for ECU 4000 to successively process the temperature sensor and outputs of the temperature sensor. Therefore, by adopting such an arrangement as the present embodiment, it is possible to realize forced termination of the reference position learning at the time of abnormality, by a simpler configuration.

In the embodiment described above, steps S110 to S160 of FIG. 14 correspond to the "reference position learning means (step)" of the present invention, and step S190 corresponds to the "termination forcing means (step)" of the present invention. Further, step S170 corresponds to the "detecting means (step)" of the present invention, and step S195 corresponds to the "power supply stopping means (step)" of the present invention.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A variable valve timing apparatus for changing a timing of opening/closing at least one of an intake valve and an exhaust valve provided in an engine, comprising:
   an actuator operating said variable valve timing apparatus;
   a changing mechanism for changing said opening/closing timing, by an amount of change in accordance with an operation amount of said actuator;
   reference position learning means configured to execute a learning operation by generating an actuator operation command so that said opening/closing timing is changed to a prescribed timing, and when said opening/closing timing reaches said prescribed timing, to learn the reference timing of opening/closing and to terminate said learning operation, in response;
   detecting means for detecting a lapse of a prescribed limit time from the start of said learning operation; and
   termination forcing means for forcing termination of said learning operation even when said opening/closing timing has not yet reached said prescribed timing, if the lapse of the limit time is detected by said detecting means, wherein
   said termination forcing means includes at least one of means for raising an alarm to a passenger over the forced termination of said learning operation and means for storing the forced termination as a piece of information for identifying the contents of failure.

2. The variable valve timing apparatus according to claim 1, wherein
   said changing mechanism is configured to change said opening/closing timing by a first amount of change in accordance with the operation amount of said actuator when said opening/closing timing is in a first region, and to change said opening/closing timing by a second amount of change larger than said first amount of change in accordance with the operation amount of said actuator when said opening/closing timing is in a second region different from said first region, and said prescribed timing is provided in said first region;
   said variable valve timing apparatus further comprising
   power supply stopping means for stopping power supply to said actuator when said learning operation is terminated forcibly by said termination forcing means.

3. The variable valve timing apparatus according to claim 1, wherein
   said changing mechanism is configured such that the change in said opening/closing timing is mechanically limited at said prescribed timing; and
   said detecting means detects that said opening/closing timing has reached said prescribed timing when the amount of change in said opening/closing timing attains to approximately zero while said operation command for changing said opening/closing timing to the prescribed timing is generated.

4. The variable valve timing apparatus according to claim 3, wherein
   said prescribed timing is set corresponding to the limit position of variable range of said opening/closing timing changed by said changing mechanism.

5. The variable valve timing apparatus according to claim 1, wherein
   said actuator is implemented by an electric motor, and the operation amount of said actuator is difference in rotation speed of said electric motor relative to the rotation speed of a camshaft driving the valve of which opening/closing timing is to be changed.

6. A variable valve timing apparatus for changing a timing of opening/closing at least one of an intake valve and an exhaust valve provided in an engine, comprising:
   an actuator operating said variable valve timing apparatus;
   a changing mechanism for changing said opening/closing timing, by an amount of change in accordance with an operation amount of said actuator; and
   a control unit for controlling an operation of said actuator; wherein
   said control unit is configured to execute a learning operation by generating an actuator operation command so that said opening/closing timing is changed to a prescribed timing, and when said opening/closing timing reaches the prescribed timing, to learn the reference timing of opening/closing and to terminate said learning operation, in response, and further to force termination of said learning operation even when said opening/closing timing has not yet reached said prescribed timing, if a lapse of a prescribed limit time from the start of said learning operation is detected, wherein
   when said learning operation is terminated forcibly, said control unit executes at least one of raising an alarm to a passenger and storage of the forced termination as a piece of information for identifying contents of the failure.

7. The variable valve timing apparatus according to claim 6, wherein
   said changing mechanism is configured to change said opening/closing timing by a first amount of change in accordance with the operation amount of said actuator when said opening/closing timing is in a first region, and to change said opening/closing timing by a second amount of change larger than said first amount of change in accordance with the operation amount of said actuator when said opening/closing timing is in a second region different from said first region, and said prescribed timing is provided in the first region; and
   said control unit further stops power supply to said actuator when the learning operation is terminated forcibly.

8. The variable valve timing apparatus according to claim 6, wherein
   said changing mechanism is configured such that the change in said opening/closing timing is mechanically limited at said prescribed timing; and
   said control unit detects that said opening/closing timing has reached said prescribed timing when the amount of change in said opening/closing timing attains to approximately zero while said operation command for changing said opening/closing timing to said prescribed timing is generated.

9. The variable valve timing apparatus according to claim 8, wherein
   said prescribed timing is set corresponding to the limit position of variable range of said opening/closing timing changed by said changing mechanism.

10. A method of controlling a variable valve timing apparatus for changing a timing of opening/closing at least one of an intake valve and an exhaust valve provided in an engine; wherein
   said variable valve timing apparatus includes
   an actuator operating said variable valve timing apparatus, and
   a changing mechanism that changes said opening/closing timing by an amount of change in accordance with an operation amount of said actuator;

said method of controlling comprising:

a reference position learning step of executing a learning operation by generating an actuator operation command so that said opening/closing timing is changed to a prescribed timing, and when said opening/closing timing reaches said prescribed timing, learning the reference timing of opening/closing and terminating said learning operation, in response;

a detecting step of detecting a lapse of a prescribed limit time from the start of said learning operation; and a termination forcing step of forcing termination of said learning operation even when said opening/closing timing has not yet reached said prescribed timing, if the lapse of the limit time is detected in said detecting step, wherein in said termination forcing step, when said learning operation is terminated forcibly, at least one of raising an alarm to the passenger and storage of the forced termination as a piece of information for identifying the contents of the failure is executed.

11. The method of controlling a variable valve timing apparatus according to claim 10, wherein said changing mechanism is configured to change said opening/closing timing by a first amount of change in accordance with the operation amount of said actuator when said opening/closing timing is in a first region, and to change said opening/closing timing by a second amount of change larger than said first amount of change in accordance with the operation amount of said actuator when said opening/closing timing is in a second region different from said first region, and said prescribed timing is provided in the first region; and said control method further comprising a power supply stopping step of stopping power supply to said actuator when said learning operation is terminated forcibly in said termination forcing step.

12. The method of controlling a variable valve timing apparatus according to claim 10, wherein said changing mechanism is configured such that the change in said opening/closing timing is mechanically limited at said prescribed timing; and in said detecting step, it is detected that said opening/closing timing has reached said prescribed timing, when the amount of change in said opening/closing timing attains to approximately zero while said operation command for changing said opening/closing timing to said prescribed timing is generated.

13. The method of controlling a variable valve timing apparatus according to claim 12, wherein said prescribed timing is set corresponding to the limit position of variable range of said opening/closing timing changed by said changing mechanism.

14. The method of controlling a variable valve timing apparatus according to claim 10, wherein said actuator is implemented by an electric motor, and the operation amount of said actuator is difference in rotation speed of said electric motor relative to the rotation speed of a camshaft driving the valve of which opening/closing timing is to be changed.

* * * * *